US012488360B2

(12) United States Patent
Hatfield et al.

(10) Patent No.: US 12,488,360 B2
(45) Date of Patent: Dec. 2, 2025

(54) PRODUCT PERFORMANCE ESTIMATION IN A VIRTUAL REALITY ENVIRONMENT

(71) Applicant: International Business Machines Corporation, Armonk, NY (US)

(72) Inventors: Jennifer M. Hatfield, San Francisco, CA (US); Michael Bender, Ryebrook, NY (US); Jill Dhillon, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 17/071,176

(22) Filed: Oct. 15, 2020

(65) Prior Publication Data

US 2022/0122096 A1    Apr. 21, 2022

(51) Int. Cl.
*G06Q 30/0201* (2023.01)
*G06F 3/01* (2006.01)
*G06F 40/20* (2020.01)

(52) U.S. Cl.
CPC ......... *G06Q 30/0201* (2013.01); *G06F 3/011* (2013.01); *G06F 40/20* (2020.01)

(58) Field of Classification Search
USPC ........................................................ 705/7.29
See application file for complete search history.

(56) References Cited

U.S. PATENT DOCUMENTS 10,147,238 B2 * 12/2018 Locke ................ G06Q 30/0201

10,152,738 B2 * 12/2018 Jouhikainen ....... G06Q 30/0623
10,234,853 B2   3/2019 Mukkamala et al.
2008/0065468 A1 *  3/2008 Berg ...................... G06Q 30/02
                                                                      705/7.32

(Continued)

FOREIGN PATENT DOCUMENTS

CA          2765118 C      9/2015
WO     2010/144368 A3     12/2010

OTHER PUBLICATIONS

Substitutional Reality: Using the Physical Environment to Design Virtual Reality Experiences, Simeone et al., Augmented & Virtual reality in the Real World (Year: 2015).*

(Continued)

*Primary Examiner* — Allison M Robinson
(74) *Attorney, Agent, or Firm* — Onyx IP Group

(57) ABSTRACT

Disclosed embodiments provide improvements in this technical field by utilizing a digital twin (DT) in a virtual reality (VR) environment. A digital twin is created of a product to be assessed in a normal setting (e.g. an automobile on a highway, an appliance in a kitchen, etc). The individual then uses the product in the digital twin virtual reality environment (DTVRE). During interaction, positive and negative experiences are tagged for later evaluation. Additionally, a person's activities with similar products in a physical environment are monitored using IoT (Internet of Things) sensors. During interactions, sensor data is collected. Embodiments compare the sensor data acquired in the physical environment (PE) and the digital twin virtual reality environment (DTVRE). For the product being used in the digital twin virtual reality environment (DTVRE), embodiments estimate, using the collected data, how the product will perform in a physical environment (PE).

25 Claims, 20 Drawing Sheets

(56) References Cited

U.S. PATENT DOCUMENTS

| | | | | |
|---|---|---|---|---|
| 2008/0162261 | A1* | 7/2008 | Velazquez | G06F 3/011 |
| | | | | 715/757 |
| 2008/0162262 | A1* | 7/2008 | Perkins | G06Q 30/02 |
| | | | | 715/757 |
| 2008/0163054 | A1* | 7/2008 | Pieper | G16H 50/50 |
| | | | | 715/706 |
| 2010/0149093 | A1* | 6/2010 | Edwards | G06F 3/013 |
| | | | | 705/27.2 |
| 2015/0371443 | A1* | 12/2015 | Troy | G06T 19/006 |
| | | | | 345/633 |
| 2016/0171514 | A1* | 6/2016 | Frank | G06Q 30/02 |
| | | | | 705/7.29 |
| 2016/0247129 | A1 | 8/2016 | Song et al. | |
| 2018/0232921 | A1* | 8/2018 | Smith | G06Q 30/0201 |
| 2018/0239840 | A1 | 8/2018 | Santarone et al. | |
| 2018/0255335 | A1* | 9/2018 | George | H04N 21/4532 |
| 2019/0108191 | A1* | 4/2019 | Frank | G06F 16/337 |
| 2019/0361589 | A1 | 11/2019 | Yerli | |
| 2020/0051338 | A1* | 2/2020 | Zia | G06F 9/451 |
| 2021/0004076 | A1* | 1/2021 | Schweet | G06N 5/04 |
| 2021/0106910 | A1* | 4/2021 | Jain | G05B 15/02 |
| 2021/0279790 | A1* | 9/2021 | Banipal | G06Q 30/0185 |

OTHER PUBLICATIONS

Fei Tao et al., "Digital twin-driven product design framework", International Journal of Production Research, Feb. 25, 2018, vol. 57, No. 12, 20 pages.

Authors et al.: Disclosed Anonymously, IP.com No. IPCOM000261908D, Apr. 16, 2020, 3 pages.

* cited by examiner

| Rank preferred features (0 – 5) | Rank features on current product (0 – 5) |
|---|---|
| Butter Door Access: 1 | Butter Door Access: 5 |
| Temperature Control: 3 | Temperature Control: 5 |
| Freezer Access: 4 | Freezer Access: 1 |
| Ice Dispenser Access: 5 | Ice Dispenser Access: 5 |
| Water Dispenser Access: 0 | Water Dispenser Access: 0 |
| Noise Level: 2 | Noise Level: 3 |
| Shelf Adjustability: 3 | Shelf Adjustability: 1 |
| Child Lockout: 1 | Child Lockout: 0 |
| Produce Drawer Access: 4 | Produce Drawer Access: 4 |

FIG. 5

PRODUCT PERFORMANCE ESTIMATION IN A VIRTUAL REALITY ENVIRONMENT

FIELD

The present invention relates generally to product performance estimation, and more particularly, to product performance estimation in a virtual reality environment.

BACKGROUND

Product performance estimation pertains to the analysis of various product parameters in order to assess how a particular product may perform under certain conditions, as well as evaluating certain criteria.

Virtual reality (VR) pertains to a computer-generated process that immerses the user into a virtual environment. Using a device such as a VR headset, virtual reality provides a user with the sensation of a simulated world or environment. During a VR session, a user may move his/her body in the virtual environment in a manner similar to how he/she would in a corresponding physical environment.

Virtual reality is performed by stimulating various human senses. A major aspect of virtual reality is stimulating the visual senses. VR headsets are designed to create an immersive 3-dimensional (3D) environment. VR headsets include the optics and electronics for rendering a display, on a screen, in front of a person's eyes that displays a view of the virtual environment. Two autofocus lenses are generally placed between the screen and the eyes that adjust based on individual eye movement and positioning. The visual elements provided to the user on the screen are rendered by an electronic computing device such as a mobile phone or other connected computing device.

Another aspect of virtual reality is sound. Sound that is synchronized with the visual component can create very engaging effects. Headphone speakers, combined with audio processing to create directional sound effects, can help to provide an immersive experience. As technology improves, new and exciting applications for virtual reality are enabled.

SUMMARY

In one embodiment, there is provided a computer-implemented method for product performance estimation, comprising: collecting biometric data for a user during a first interaction period, wherein the first interaction period includes the user using a first product in a physical environment; collecting biometric data for the user during a second interaction period, wherein the second interaction period includes the user using a second product in a virtual environment; computing a first acceptance score for the first product based on the collected biometric data from the first interaction period; computing a second acceptance score for the second product based on the collected biometric data from the second interaction period; and estimating a third acceptance score for using the second product in the physical environment based on the first acceptance score and the second acceptance score.

In another embodiment, there is provided a computer-implemented method for product performance estimation, comprising: identifying a plurality of preferred features for a product category; collecting biometric data for a user during a first interaction period, wherein the first interaction period includes the user using preferred features of a first product in a physical environment; collecting biometric data for the user during a second interaction period, wherein the second interaction period includes the user using preferred features of a second product in a virtual environment; computing a first acceptance score for the first product based on the collected biometric data from the first interaction period; computing a second acceptance score for the second product based on the collected biometric data from the second interaction period; and estimating a third acceptance score for using the second product in the physical environment based on the first acceptance score and the second acceptance score.

In another embodiment, there is provided an electronic computation device comprising: a processor; a memory coupled to the processor, the memory containing instructions, that when executed by the processor, cause the electronic computation device to: identify a plurality of preferred features for a product category; collect biometric data for a user during a first interaction period, wherein the first interaction period includes the user using preferred features of a first product in a physical environment; collect biometric data for the user during a second interaction period, wherein the second interaction period includes the user using preferred features of a second product in a virtual environment; compute a first acceptance score for the first product based on the collected biometric data from the first interaction period; compute a second acceptance score for the second product based on the collected biometric data from the second interaction period; and estimate a third acceptance score for using the second product in the physical environment based on the first acceptance score and the second acceptance score.

In another embodiment, there is provided a computer program product for an electronic computation device comprising a computer readable storage medium having program instructions embodied therewith, the program instructions executable by a processor to cause the electronic computation device to: identify a plurality of preferred features for a product category; collect biometric data for a user during a first interaction period, wherein the first interaction period includes the user using preferred features of a first product in a physical environment; collect biometric data for the user during a second interaction period, wherein the second interaction period includes the user using preferred features of a second product in a virtual environment; compute a first acceptance score for the first product based on the collected biometric data from the first interaction period; compute a second acceptance score for the second product based on the collected biometric data from the second interaction period; and estimate a third acceptance score for using the second product in the physical environment based on the first acceptance score and the second acceptance score.

BRIEF DESCRIPTION OF THE DRAWINGS

Features of the disclosed embodiments will be more readily understood from the following detailed description of the various aspects of the invention taken in conjunction with the accompanying drawings.

FIG. 5 is an exemplary user interface for preferred features for a product category.

Figure 1:
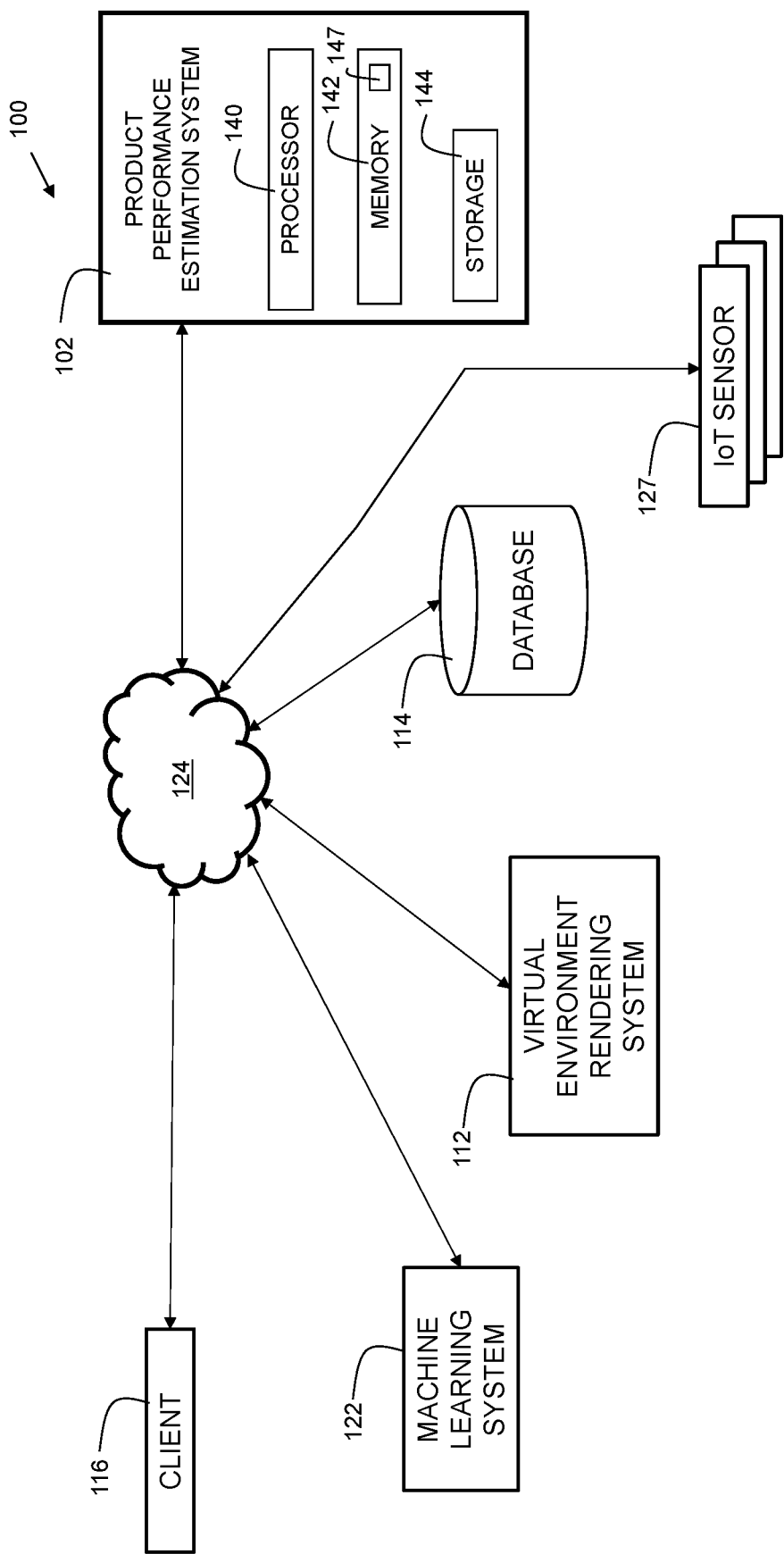
FIG. 1 is an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Consumers purchase many types of items, but there can be questions and/or concerns regarding the compatibility of the product with the consumer before they utilize it. Some products, such as automobiles and appliances, can be evaluated at a showroom or with a brief user session (e.g., via a test drive of an automobile). However, that only provides a relatively short assessment window.

Disclosed embodiments provide product performance estimation in a virtual reality (VR) environment by utilizing a digital twin (DT) in a VR environment. A digital twin is created of a product to be assessed in a normal setting (e.g., car on highway, kitchen layout for house, etc.). The user then uses the product in the digital twin virtual reality environment (DTVRE). During interaction, positive and negative experiences are tagged for later evaluation. Additionally, a person's activities with similar products in a physical environment are monitored using Internet of Things (IoT) sensors. During interactions, sensor data is collected. Embodiments compare the sensor data acquired in the physical environment (PE) and the DTVRE. For the product being used in the DTVRE, embodiments estimate, using the collected data, how the product will perform in a PE.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 is an example environment 100 for disclosed embodiments. A product performance estimation system (PPES) 102 may include a processor 140, memory 142, and storage 144. The processor 140 is coupled to the memory 142 such that it can access instructions 147 stored in memory 142. The processor 140 executes the instructions 147, stored in memory 142, in some implementations of disclosed embodiments. Memory 142 may include dynamic random-access memory (DRAM), static random-access memory (SRAM), magnetic storage, and/or a read only memory such as flash, EEPROM, optical storage, or other suitable memory. In some embodiments, the memory 142 may not be a transitory signal per se. The storage 144 may include one or more hard disks, or other suitable storage technology. The PPES 102 is connected (wirelessly or wired) to network 124. Network 124 is the Internet, a wide area network, a local area network, or any other suitable network. System 102 is an electronic computation device. Note that while one such device is shown in environment 100, in practice, there may be multiple electronic computing devices operating in a distributed manner for load balancing and data redundancy.

Product performance estimation system (PPES) 102 acquires data from a plurality of Internet of Things (IoT) sensors, indicated generally as 127. These IoT sensors can include, but are not limited to, biometric sensors, such as wearable biometric sensors, cameras, microphones, and/or other sensors within the physical environment. The biometric sensors can include, but are not limited to, a heart rate sensor, a breathing rate sensor, a body temperature sensor, a blood pressure sensor, a perspiration sensor, an eye tracking sensor, and/or a muscle tension sensor. These sensors collect data that can be used to perform a product performance estimation. The data from the biometric sensors may be coupled with image and/or audio data from the physical environment. The image data can come from cameras placed within the physical environment. The image data can include facial data for a user. The facial data can be analyzed to estimate a user's state when interacting with a product in a physical environment and/or virtual environment. The user's state can include states such as engagement, frustration, boredom, anger, happiness, and the like. Audio data may also be acquired from microphones placed within the physical environment. The audio can include sound level data. The audio data can include speech data from the user. The speech data may be analyzed using a natural language processing (NLP) system, such as provided by machine learning system 122. The sound level and/or speech data may be used as part of assessing a user's experience while interacting with a product in a physical and/or virtual environment. For example, an elevated sound level from the user may be indicative of frustration. Words uttered by the user can be analyzed and a polarity of one or more uttered words may be assessed. A word having a positive polarity may be associated with a positive user experience. Examples of positive polarity words can include "good," "wow," and "cool." Examples of negative polarity words can include "no," "ugh," and "lousy." These are merely examples, and in practice, any number of words may be assigned a polarity for the purposes of sentiment analysis to be used as part of a product performance estimation.

Client device 116 is an electronic computing device that provides virtual reality capability. It may include a virtual reality headset, mobile computing device (e.g., a smartphone, tablet computer, or other suitable computing device), laptop computer, desktop computer, and/or wearable computing device. In embodiments, a user uses client device 116 to navigate a digital twin virtual environment (world) to perform a virtual action that is associated with a task that corresponds to a similar task in the physical world. Various biometric and/or environmental data is acquired during performance of the task. This data drives a product assessment in the digital twin virtual environment and enables an estimation of the performance of the product in a similar physical environment. Although only one client device is shown, in implementations, more than one client device may operate in the environment.

Machine learning system 122 may be used to further categorize and classify input data including biometric data acquired from IoT sensors, image data, scenery, object recognition and/or object classification, person recognition, natural language processing (NLP), sentiment analysis, and/or other classification processes. Machine learning system 122 may include one or more neural networks, convolutional neural networks (CNNs), and/or other deep learning techniques. The machine learning system 122 may include regression algorithms, classification algorithms, clustering techniques, anomaly detection techniques, Bayesian filtering, and/or other suitable techniques to analyze the information obtained by the product performance estimation system (PPES) 102 to assist in categorizing the information. Note that while one system 122 is shown in environment 100, in practice, there may be multiple electronic computing devices operating in a distributed manner for load balancing and data redundancy.

Virtual environment rendering system (VERS) 112 comprises one or more computing devices that renders a virtual environment corresponding to a physical environment. Note that while one such system 112 is shown in environment 100, in practice, there may be multiple electronic computing devices operating in a distributed manner for load balancing and data redundancy. VERS 112 may utilize input data that includes multiple images and/or video feeds of a premises, including panoramic and/or 360-degree video. For example, the input data can include feeds from multiple digital video cameras disposed throughout a home of a user, capturing multiple views of the premises, including multiple views of the same scene from different viewing angles, providing physical environment information to the VERS 112. In embodiments, VERS 112 may interface with machine learning system 122 to perform image analysis to identify and/or classify objects within the video feeds. These objects may then be indicated in the virtual environment with additional highlighting and/or annotation. The VERS 112 may then replace an object from the physical environment with a different object to perform a product performance estimation. As an example, a physical environment of a kitchen may include a refrigerator of type "Model A." The VERS 112 may substitute the "Model A" refrigerator with a "Model B" refrigerator, allowing a user to interact with the "Model B" refrigerator in a virtual environment that is very similar to his/her own kitchen, but with the "Model B" refrigerator in place of the user's own "Model A" refrigerator. In this way, the user can better visualize the "Model B" refrigerator in his/her own kitchen. Additionally, the user can perform certain tasks in the digital twin virtual reality environment, such as opening and closing doors of the refrigerator, operating the refrigerator's ice dispenser, and/or other relevant tasks.

Database 114 may be used to store data about the physical environments and/or virtual environments in which disclosed embodiments are used. The data can include floorplan data, data regarding IoT sensors, cameras, and microphones available in the premises, specifications for various products undergoing assessments, and/or custom preferences established by the user. Database 114 may be a relational database such as a Structured Query Language (SQL) database.

In embodiments, a user may opt-in to allow systems to access and analyze the video data and/or biometric data used in the analysis by the product performance estimation system (PPES) 102. Thus, a user gives permission for the data to be used by the product performance estimation system (PPES) 102. In doing so, the user obtains the benefit of product performance assessment in a digital twin virtual reality environment (DTVRE) before purchase of the actual product for use in the physical environment. In this way, if the product performance estimation reveals a low score, the user may choose to not purchase that product. This helps reduce occurrences of a poor customer experience, thereby serving to help both consumers and producers of such products.

Figure 2:
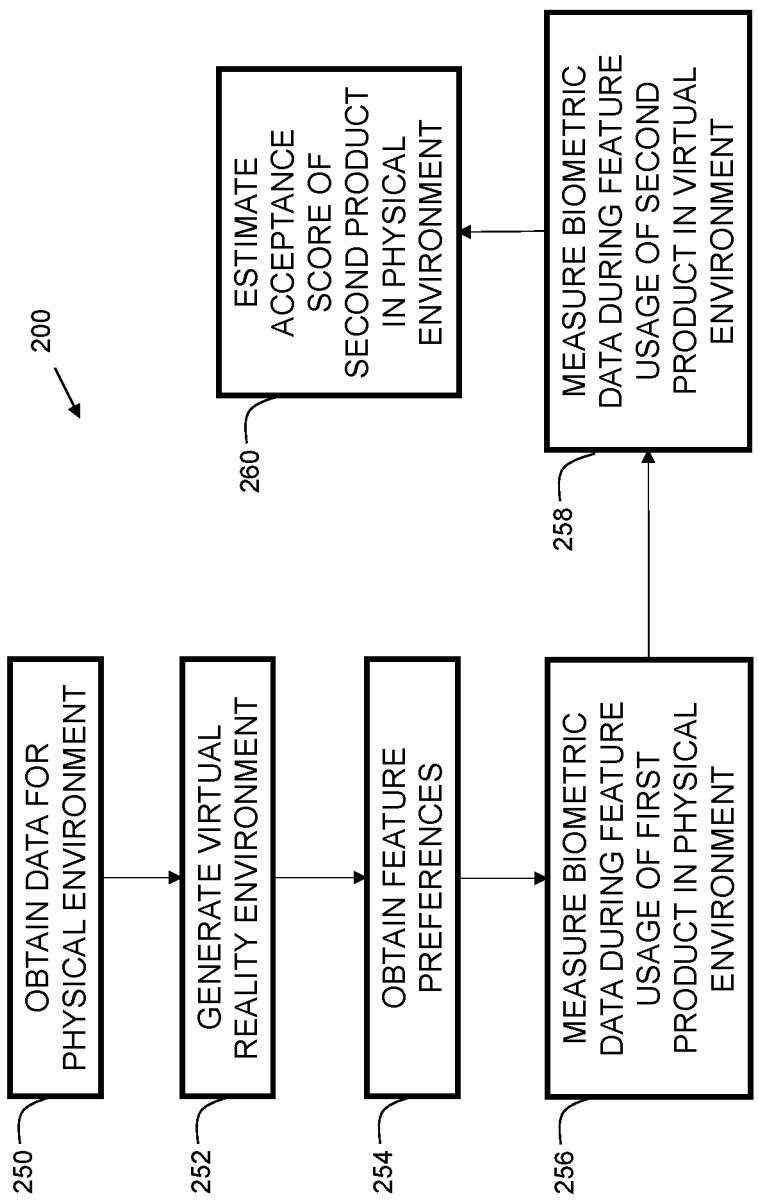
FIG. 2 is a flowchart for an embodiment of the present invention.

FIG. 2 is a flowchart 200 for an embodiment of the present invention. At 250, data is obtained for a physical environment. As an example, a physical environment can include a kitchen of a user's home. In some embodiments, a user may provide video (e.g. via uploading), such as 360-degree video, and/or other digital data such as floorplans from CAD (Computer Aided Design) files and/or other suitable data, to a virtual environment rendering system 112.

At 252, a virtual reality environment is generated by the VERS 112, based on the data obtained at 250. This virtual reality environment may be a digital twin virtual reality environment (DTVRE). The DTVRE may look the same or substantially similar to the physical environment.

At 254, feature preferences are obtained. This can include specific features of a product and/or preferred features for a product category that are of importance to a user. A product category can pertain to a type of product. An example product category can be "refrigerator" which can include various types and sizes of refrigerator. As an example, to illustrate preferred features for a product category, a refrigerator can have various features, such as a refrigerated section, a freezer section, an ice dispenser, a water dispenser, a butter door, a child lockout feature, and more. Some of these features may be very important to a user, while other features may be of little importance, or not applicable to a user. For example, if the kitchen of a user does not provide a water line, then features such as a water dispenser may be deemed not applicable. Additionally, if the user doesn't have children, then the child lock feature may be skipped during an assessment of a product in a digital twin virtual reality environment (DTVRE). Conversely, if a feature is important to a user, then that feature would be evaluated during an assessment of a product in a DTVRE. For example, if produce drawer access is an important feature for a given user, then for that user, part of the assessment of a product in a DTVRE may include use of the produce drawer.

At 256, biometric data is measured during feature usage of a first product in a physical environment. Returning again to the refrigerator example, if the user currently has a "Model A" refrigerator in his/her kitchen, the biometric data can include data acquired from the user as he/she operates the current (Model A) refrigerator in the physical environment. From this data, inferences can be made, for example, it can be inferred which activities are frequently performed, how much effort is exerted during such activities, and/or user sentiment levels during performing of such activities. In some embodiments, a change in sentiment (positive or negative) may be used to identify a subset of features for evaluation of a different product in a DTVRE. For example, if biometric data indicates elevated exertion and/or frustration of the user while operating an ice dispenser of the user's current refrigerator in his/her kitchen, then that feature can be automatically tagged for evaluation of a different refrigerator model in the DTVRE.

At 258, biometric data is measured during feature usage of a second product in a virtual environment. Returning again to the refrigerator example, the user may be considering replacing his/her Model A refrigerator with a Model B refrigerator. The VERS 112 can generate DTVRE of the user's kitchen based on data provided by the user. The VERS 112 can then replace the Model A refrigerator with a Model B refrigerator in the DTVRE. This may be performed using currently available image processing techniques known in the art.

The user may be prompted to perform various tasks in the digital twin virtual reality environment DTVRE using a second product. The second product may be a product the user is considering for purchase. Returning again to the refrigerator example, the user may be prompted to open the refrigerator and freezer, remove objects from the refrigerator, place objects in the refrigerator, adjust shelves, operate an ice dispenser, and/or other relevant tasks. As the user performs the tasks in the DTVRE, biometric data is collected.

At 260, an estimate of a product acceptance score of the second product in a physical environment is performed. Returning again to the refrigerator example, the user may evaluate his/her current refrigerator (Model A) in a physical environment (his/her kitchen). The user may then evaluate a candidate refrigerator (Model B) in a DTVRE. Based on data from the evaluation of Model A in a physical environment, and the evaluation of Model B in the digital twin virtual reality environment (DTVRE), an estimation of product performance of Model B in a physical environment is computed, allowing consumers to make a better-informed decision about the purchase of a new item (Model B).

In some embodiments, a first acceptance score is computed for a first product in a physical environment, and a second acceptance score is computed for a second product in a digital twin virtual reality environment (DTVRE). Then, an estimated acceptance score for the second product in a physical environment is generated. This is based on analysis of biometric data from the physical environment and the virtual environment. Since the combination of the second product in the physical environment has not occurred, there is no biometric data for that scenario. Disclosed embodiments estimate the acceptance score for that scenario based on the data obtained at 256 and 258, thereby giving a user an indication of product performance of the second product in a physical environment. In some embodiments, some of the steps shown in flowchart 200 may be performed in a different order, performed simultaneously, or omitted.

Figure 3A:
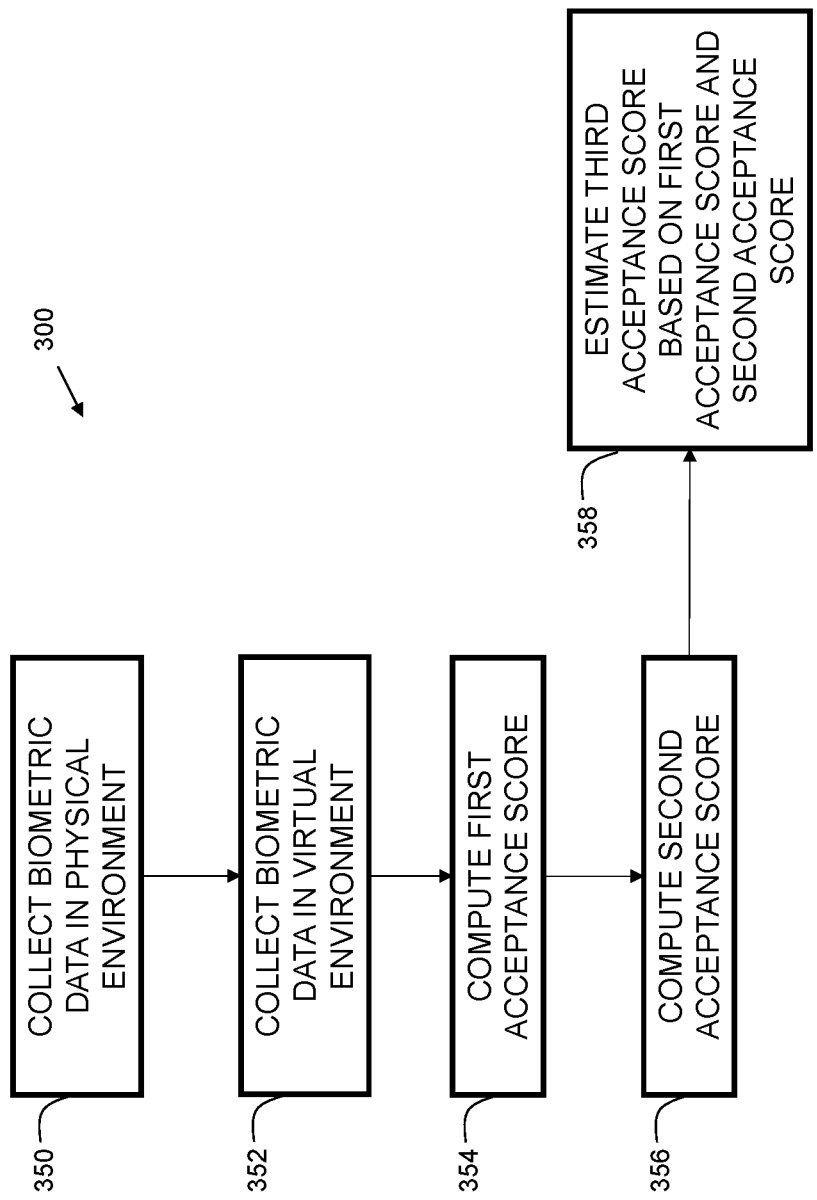
FIG. 3A is a flowchart showing additional processes for an embodiment of the present invention.

FIG. 3A is a flowchart 300 showing additional processes for an embodiment of the present invention. At 350, biometric data is collected for a user in a physical environment as he/she interacts with a physical product. At 352, biometric data is collected for a user in a virtual environment as he/she interacts with a virtual product. In embodiments, the virtual product is of the same product category as the physical product. Returning again to the refrigerator example, both the physical product and the virtual product may be a refrigerator. At 354, a first acceptance score is computed based on data collected at 350. At 356, a second acceptance score is computed, based on data collected at 352.

In some embodiments, an acceptance score S may be computed as:

$$S = A(\mathrm{MAX}(F_1)) + B(\mathrm{MAX}(F_2)) + C(\Delta F_1) + D(\Delta F_2)$$

Where A, B, C, and D are scaling constants, $F_1$ is a first biometric parameter, and $F_2$ is a second biometric parameter. Thus, the factors used in determining the score can include a maximum value of a biometric parameter during performing of a task, as well as the change in a biometric parameter during performing of a task. In embodiments, the first biometric factor can be heart rate, and the second biometric factor can be a breathing rate. In some embodiments, the score S may be normalized to a range (e.g., 0-100). While two biometric parameters are shown here, in practice, there can be more or fewer biometric parameters used in deriving an acceptance score S.

In embodiments, the first acceptance score is based on change in heart rate during the first interaction period, and the second acceptance score is based on change in heart rate during the second interaction period. In embodiments, the first acceptance score is based on change in respiration rate during the first interaction period, and the second acceptance score is based on change in respiration rate during the second interaction period.

At 358, a third acceptance score is estimated based on a first acceptance score and a second acceptance score. The third acceptance score can represent the product performance of a second product in a physical environment. Since no biometric data exists for this scenario, the disclosed embodiments perform the estimation of the second product in a physical environment, thereby giving a user an indication of product performance of the second product in a physical environment without the user having to physically obtain and install the second product in the physical environment. In some embodiments, the third acceptance score is computed by utilizing changes in detected satisfaction with the second product as compared with the first product, as well as the overall satisfaction with the second product to determine a predicted satisfaction level in the form of a third acceptance score. In embodiments, estimating the third acceptance score includes computing a difference between the first acceptance score and the second acceptance score. The third acceptance score is indicative of product performance of the second product in a physical environment.

Figure 3B:
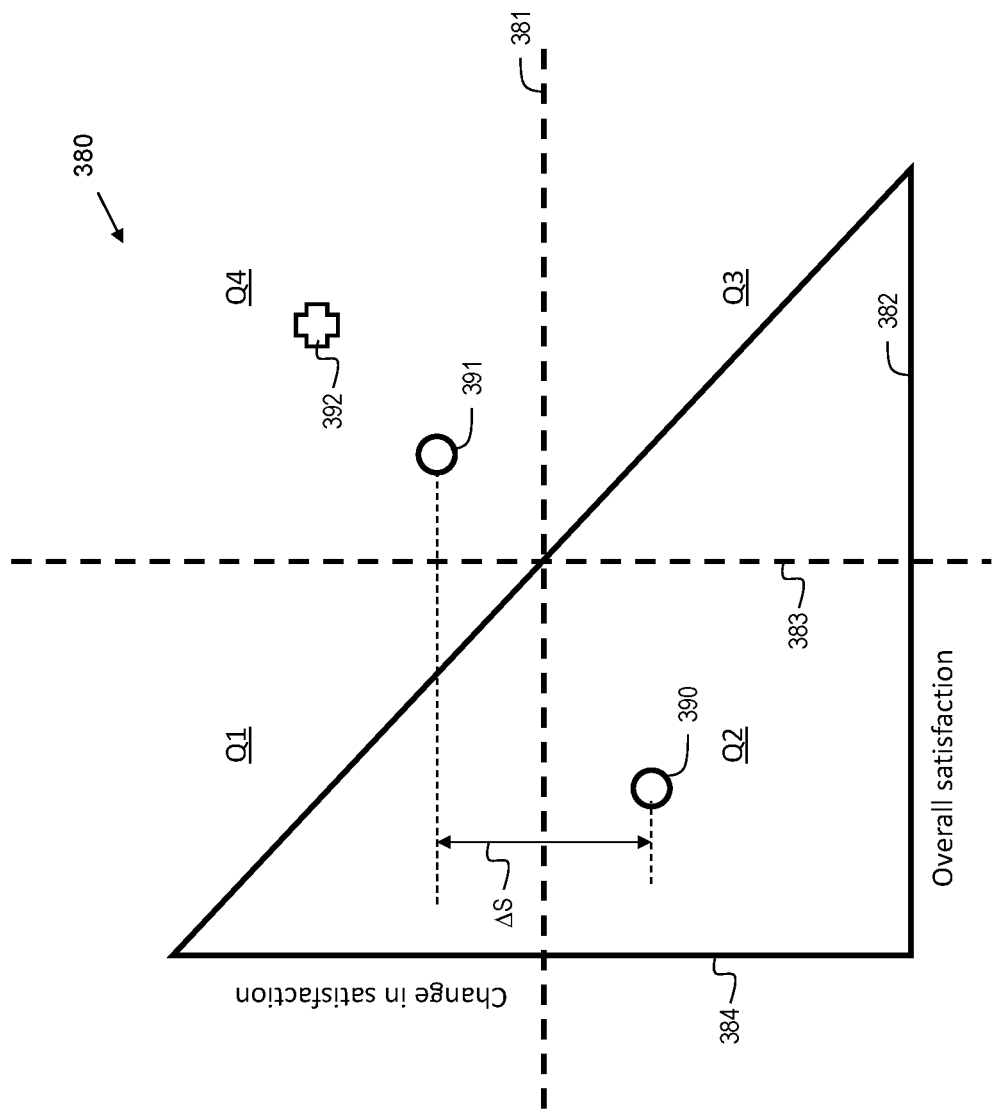
FIG. 3B shows a graph illustrating deriving a third acceptance score.

FIG. 3B shows a graph 380 illustrating deriving a third acceptance score. Graph 380 maps relationships between overall satisfaction and change in satisfaction. The X-axis 382 represents overall satisfaction. The Y-axis 384 represent change in overall satisfaction. The horizontal line 381 represents a zero-level in change in satisfaction. Vertical line 383 represents a mid-point in satisfaction level. Lines 381 and 383 form four quadrants, indicated as Q1, Q2, Q3, and Q4. Data point 390 represents an acceptance score of a first product evaluated in a physical environment. Data point 391 represents an acceptance score of a second product in a virtual environment. Data point 392 represents an estimated product acceptance score of the second product in a physical environment. The estimated product acceptance score can be based on an overall satisfaction of the assessment in the virtual environment shown at 391, as well as a change in satisfaction between the first product and second product, represented by ΔS, which is a change along Y-axis 384 between data point 391 and data point 390. Quadrant Q4 represents a positive change in satisfaction and a positive overall satisfaction. Thus, estimated product acceptance scores in quadrant Q4 represent successful product performance assessments.

Figure 4:
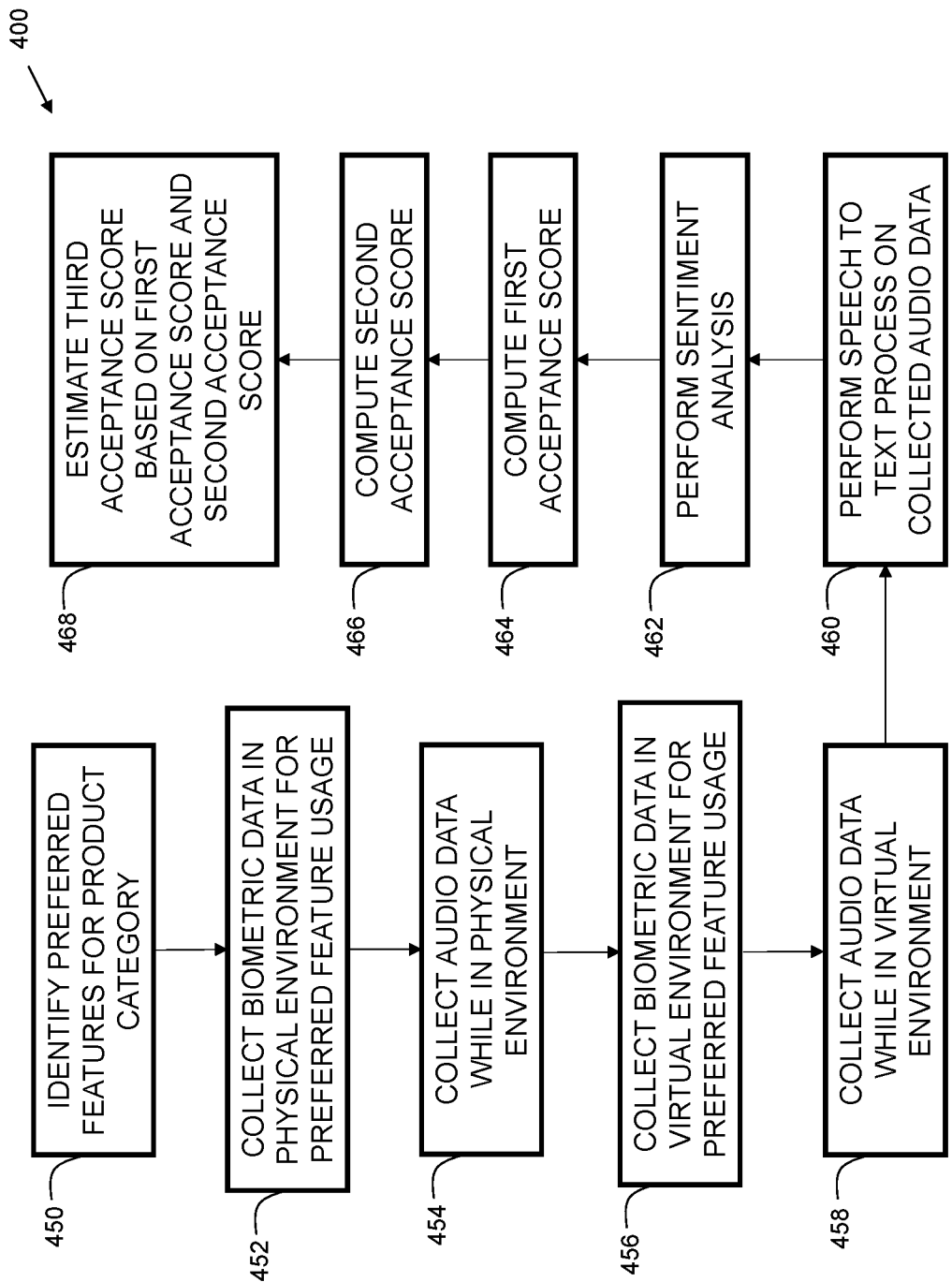
FIG. 4 is a flowchart for an additional embodiment of the present invention.

FIG. 4 is a flowchart 400 for an additional embodiment of the present invention. At 450, identifying a plurality of preferred features for a product category is performed. This can include receiving, from a user, data including a ranking for multiple features for a given product category (type). Returning again to the refrigerator example, preferred features for a refrigerator can include features such as shelf adjustability, ice dispenser operation, and so on. Since different users can have different preferred features, embodiments may receive preferred features for each user prior to computation of acceptance scores. In some embodiments, the list of tasks a user is requested to perform in a DTVRE is based on received preferred features for a given user. As an example, if the ice dispenser is a very important feature for a user, the user may be prompted to try the ice dispenser of a refrigerator in the dDTVRE. Conversely, if the ice dispenser is an unimportant feature for a user, the user might not be prompted to try the ice dispenser of a refrigerator in the digital twin virtual reality environment (DTVRE).

At 452, biometric data is collected for use of preferred features in a physical environment. Returning again to the refrigerator example, if a preferred feature is the ice dispenser, then biometric data may be collected during use of the ice dispenser. The collected biometric data may be collected from a combination of wearable sensors (such as those on a fitness tracker or smart watch), and/or cameras and/or microphones nearby to the user.

At 454, audio data is collected of the user while the user is in a physical environment. In some embodiments, the cameras and/or microphones can be from a smart speaker placed in the kitchen nearby the refrigerator. In some embodiments, the user may announce an activity aloud prior to performing the activity in a physical environment. This can be used to alert the product performance estimation system (PPES) 102 that subsequent biometric activity is to be associated with the announced task.

At 456, biometric data is collected for use of preferred features in a virtual environment. The virtual environment can be based on data provided by the user. Returning again to the refrigerator example, the virtual environment may be a kitchen based on data pertaining to the user's kitchen in a physical environment. If a preferred feature is the ice dispenser, then biometric data may be collected during simulated use of the ice dispenser in the virtual environment. The collected biometric data may be collected from a combination of wearable sensors (such as those on a fitness tracker or smart watch), and/or cameras and/or microphones nearby to the user.

At 458, audio data is collected of the user while the user is in a virtual environment. In some embodiments, the cameras and/or microphones can be from a virtual reality headset donned by the user, a smartphone, a smart speaker, a wearable device (e.g. a smart watch), and/or other suitable device.

At 460, speech to text is performed on the collected audio data from the physical environment (454) and/or the virtual environment (458). Returning again to the refrigerator example, a user may utter "ice dispenser" prior to using the ice dispenser. The smart speaker may detect the utterance, convert the utterance to text via the speech-to-text process at 460. The product performance estimation system (PPES) 102 may receive a message including an action (ice dispenser) and a timestamp. In this way, biometric activity following the received timestamp can be correlated to the activity of using the ice dispenser.

At 462, a sentiment analysis is performed. This can include identifying various moods or feelings of a user, including, but not limited to, frustration, anger, boredom, disengagement, engagement, satisfaction, happiness, and/or excitement. The identification of the various moods can be based on biometric data, including, but not limited to, heart rate, respiration rate, eye tracking, perspiration levels, muscle tension, and/or other biometric parameters. Image data such as facial data may also be used to assess moods/feelings. In some embodiments, a human face is analyzed to identify one or more action units (AUs) to discern a mood and/or a feeling. Audio data such as sound level, language analysis, rate of speaking, and/or other audio parameters may also be used in determination of a mood/feeling of a user. In some embodiments, digitized audio is converted to speech using phonemes. The words may be converted to text, and then a polarity may be applied to one or more words to determine a sentiment. A word having a positive polarity may be associated with a positive user experience.

At 464, a first acceptance score is computed. The first acceptance score is an indication of product performance of a first product in a physical environment.

At 466, a second acceptance score is computed. The second acceptance score is an indication of product performance of a second product in a virtual environment. In embodiments, the first acceptance score (464) and the second acceptance score (466) are computed with the same user. That is, in embodiments, the same person performs two product assessments, an assessment of a physical product in a physical environment, and then an assessment of a virtual product in a virtual environment. The virtual product may be of the same product category as the physical product, but of a different product. Returning again to the refrigerator example, the first product may be a "Model A" refrigerator. The second product may also be a refrigerator, but a different model (e.g., a "Model B" refrigerator).

At 468, a third acceptance score is estimated based on the first acceptance score and the second acceptance score. In embodiments, the estimated third acceptance score can be based on an overall satisfaction of the assessment in the virtual environment, as well as a change in satisfaction between the first product (evaluated in the physical environment) and second product (evaluated in a virtual environment). The third acceptance score represents an acceptance score for the second product as operated in a physical environment, providing a measure of performance without having to actually create that scenario.

In embodiments, the first acceptance score is based on audio data of the user. In embodiments, the audio data includes sound level data. Embodiments can include performing a speech-to-text process on the audio data to generate text data; and performing a sentiment analysis on the text data. Returning again to the refrigerator example, a user may perform a product assessment of his/her refrigerator in a physical environment (e.g., his/her own kitchen). Then, the user may perform a product assessment in a virtual environment of a new model of refrigerator she is considering purchasing. Embodiments then derive an estimated acceptance score of the new model of refrigerator in the physical environment of his/her kitchen, even though the combination of the new model of refrigerator in the physical environment of her kitchen does not yet exist. In this way, disclosed embodiments improve the technical field of product performance assessments.

FIG. 5 is an exemplary user interface 500 for preferred features for a product category. The example shown in FIG. 5 pertains to a refrigerator. Column 510 allows for identification of preferred features. In embodiments, features may be ranked on a numeric scale. In embodiments, the features may be ranked on a scale from zero to five, with five indicating high importance, one indicating low importance, and 0 indicating not applicable. Column 520 allows for ranking of feature satisfaction on the current product (e.g., the refrigerator currently installed in the kitchen of the user). The data in column 520 can be used in assessing change in satisfaction between the first product in the physical environment as compared with the second product in the virtual environment. Rows 532-548 indicate different features for the product category of refrigerator. Row 532 shows butter door access. Row 534 shows temperature control. Row 536 shows freezer access. Row 538 shows ice dispenser access. Row 540 shows water dispenser access. Row 542 shows noise level. Row 544 shows shelf adjustability. Row 546 shows child lockout. Row 548 shows produce drawer access. User interface 500 may be presented to a user as a questionnaire to be completed prior to performing the product assessments. The features indicated in user interface 500 are exemplary and non-limiting. Other embodiments may have more, fewer, and/or difference features than shown in FIG. 5.

At column 510, row 538, it is shown that ice dispenser access has a value of five, indicating that ice dispenser access is a feature regarded to be highly important for the user in this example. Conversely, at column 510, row 532, it is shown that butter door access has a value of one, indicating that ice dispenser access is a feature regarded to be of low importance for the user in this example.

At column 520, row 536, it is shown that freezer access has a value of one, indicating that the user in this example is not satisfied with the freezer access in her current refrigerator that is in the physical environment (e.g. installed in her kitchen). Conversely, at column 520, row 538, it is shown that ice dispenser access has a value of five, indicating that for the user in this example, the user is quite pleased with the function of the ice dispenser. At column 520, row 546, it is shown that child lockout has a value of zero, indicating that child lockout is not an applicable feature for the user in this example (e.g., his/her current refrigerator does not have the child lockout feature). Embodiments can include identifying a plurality of preferred features for a product category. The data provided by the user in columns 510 and 520 of user interface 500 is received by product performance estimation system (PPES) 102. This data can be used in the assessment of change in satisfaction between the first product in a physical environment, and a second product in a virtual environment.

Figure 6:
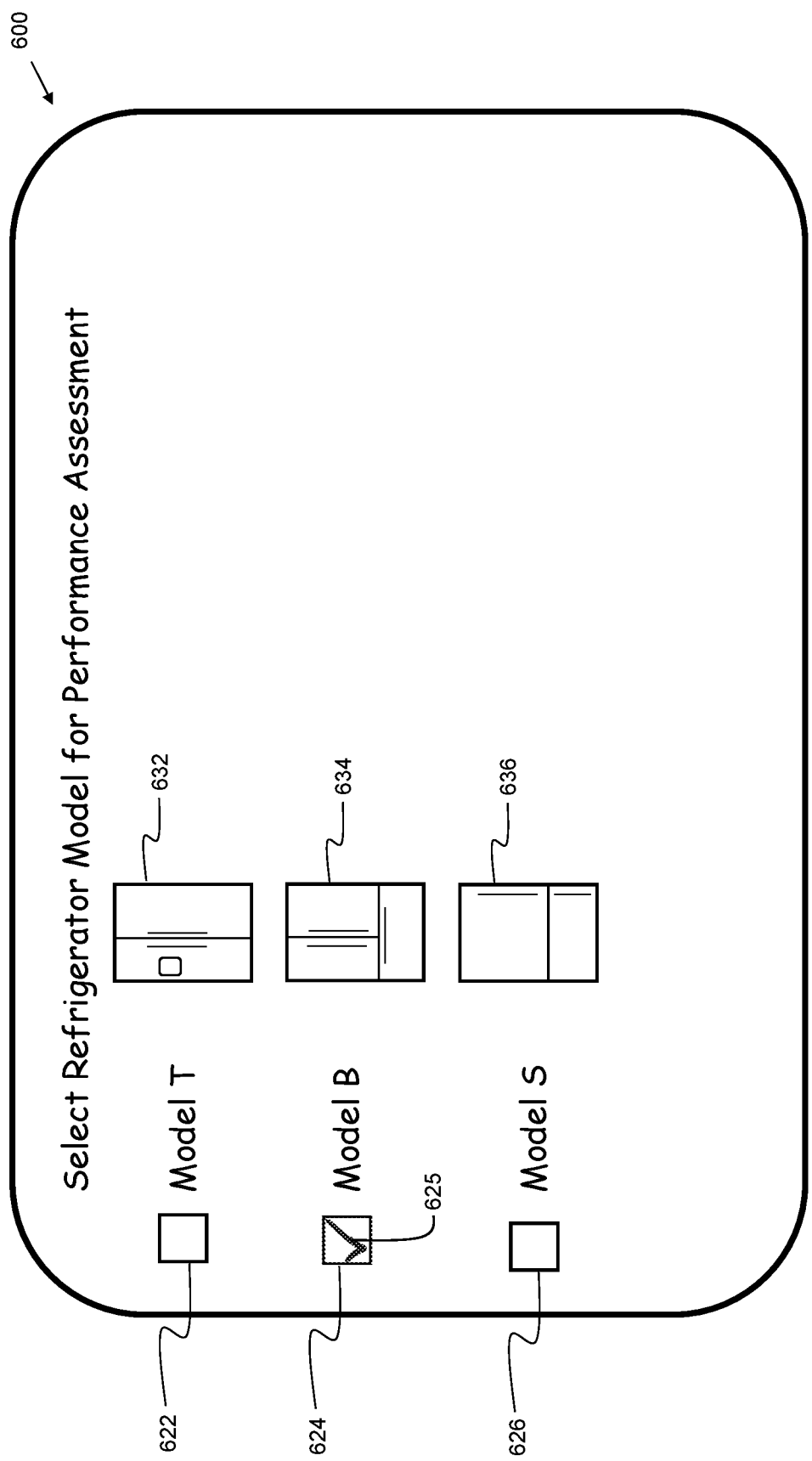
FIG. 6 is an exemplary user interface for selecting a product for a performance assessment.

FIG. 6 is an exemplary user interface 600 for selecting a product for a performance assessment. In this example, a user is considering purchasing a new refrigerator for his/her kitchen. A user is provided with one or more potential refrigerator models. In this example, three potential models are listed: Model T, Model B, and Model S. In embodiments, an image of each refrigerator may be presented, along with a checkbox to select that model for the performance assessment. As shown in FIG. 6, image 632 is an image of the Model T refrigerator, image 634 is an image of the Model B refrigerator, and image 636 is an image of the Model S refrigerator. For each refrigerator, there is a corresponding selectable checkbox. Checkbox 622 corresponds to the Model T refrigerator, checkbox 624 corresponds to the Model B refrigerator, and checkbox 626 corresponds to the Model S refrigerator. As shown in user interface 600, a checkmark 625 is disposed in checkbox 624, indicating that the user desires to obtain a performance assessment for the Model B refrigerator.

Figure 7:
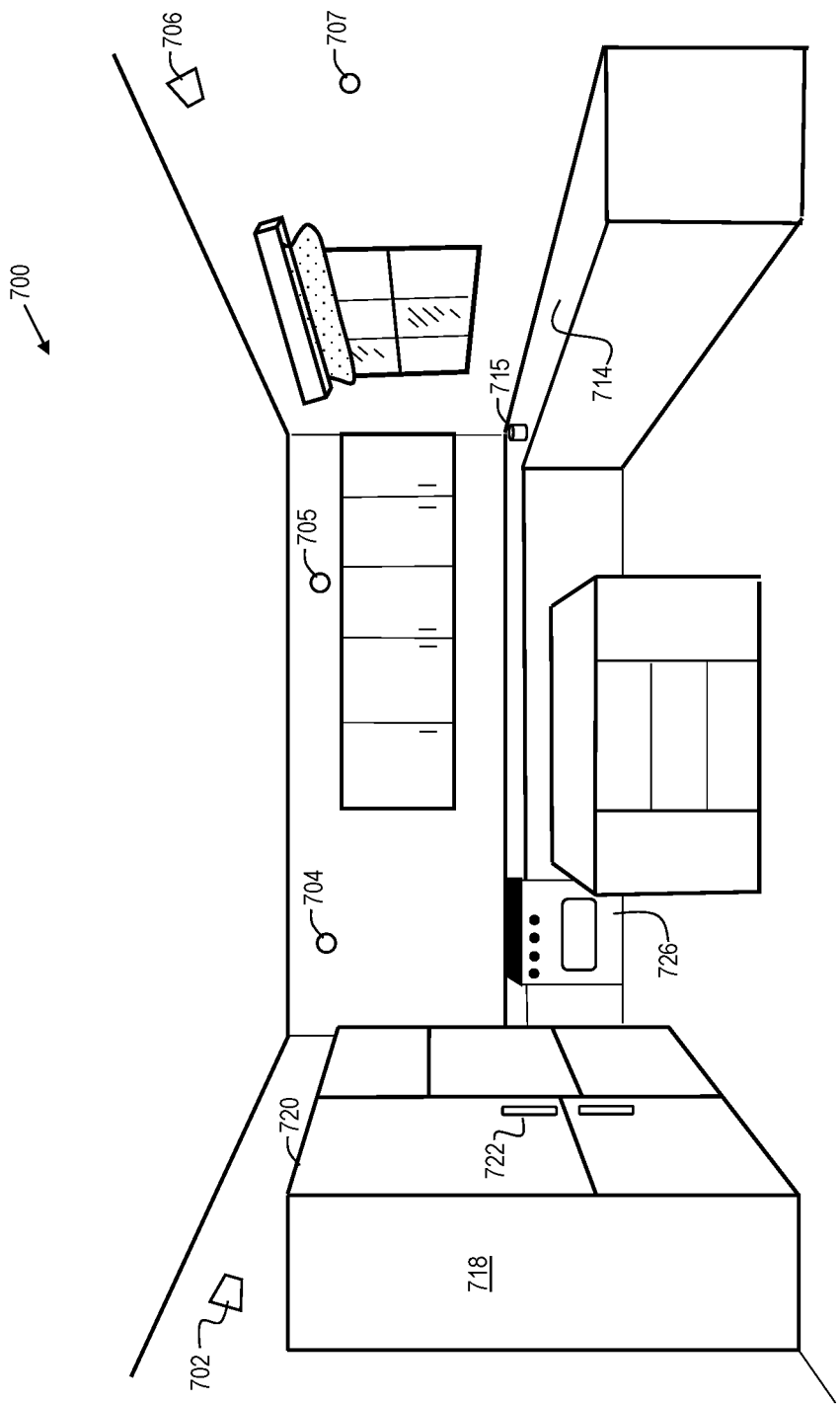
FIG. 7 is an exemplary physical environment.

FIG. 7 shows an exemplary physical environment 700. Physical environment 700 may include multiple video cameras configured and disposed to record the scene and activity within the physical environment 700. As shown in FIG. 7, a first camera 702 and a second camera 706 are disposed to capture scenes from the physical environment. In the example of FIG. 7, the physical environment is a kitchen. The physical environment 700 includes a refrigerator 718 having a door 720 and a handle 722. The physical environment 700 also includes an oven 726, and a counter 714.

The physical environment 700 may include multiple transceivers for an indoor positioning system (IPS). An indoor positioning system (IPS) allows an electronic device to determine its position within the premises. In embodiments, multiple wireless transceivers 704, 705, and 707 are positioned within physical environment 700. The wireless transceivers may include RF beacons, Wi-Fi transmitters, Bluetooth® transmitters, or other suitable devices. The wireless transceivers may be used for triangulation to determine a relative position within physical environment 700.

The physical environment 700 may further include a smart speaker 715. The smart speaker can be an Alexa®, Google Home® or other suitable smart speaker. The smart speaker 715 may be in communication with network 124 (FIG. 1) and has a microphone and may further include one or more cameras to capture audio and/or image data from the physical environment 700.

Figure 8:
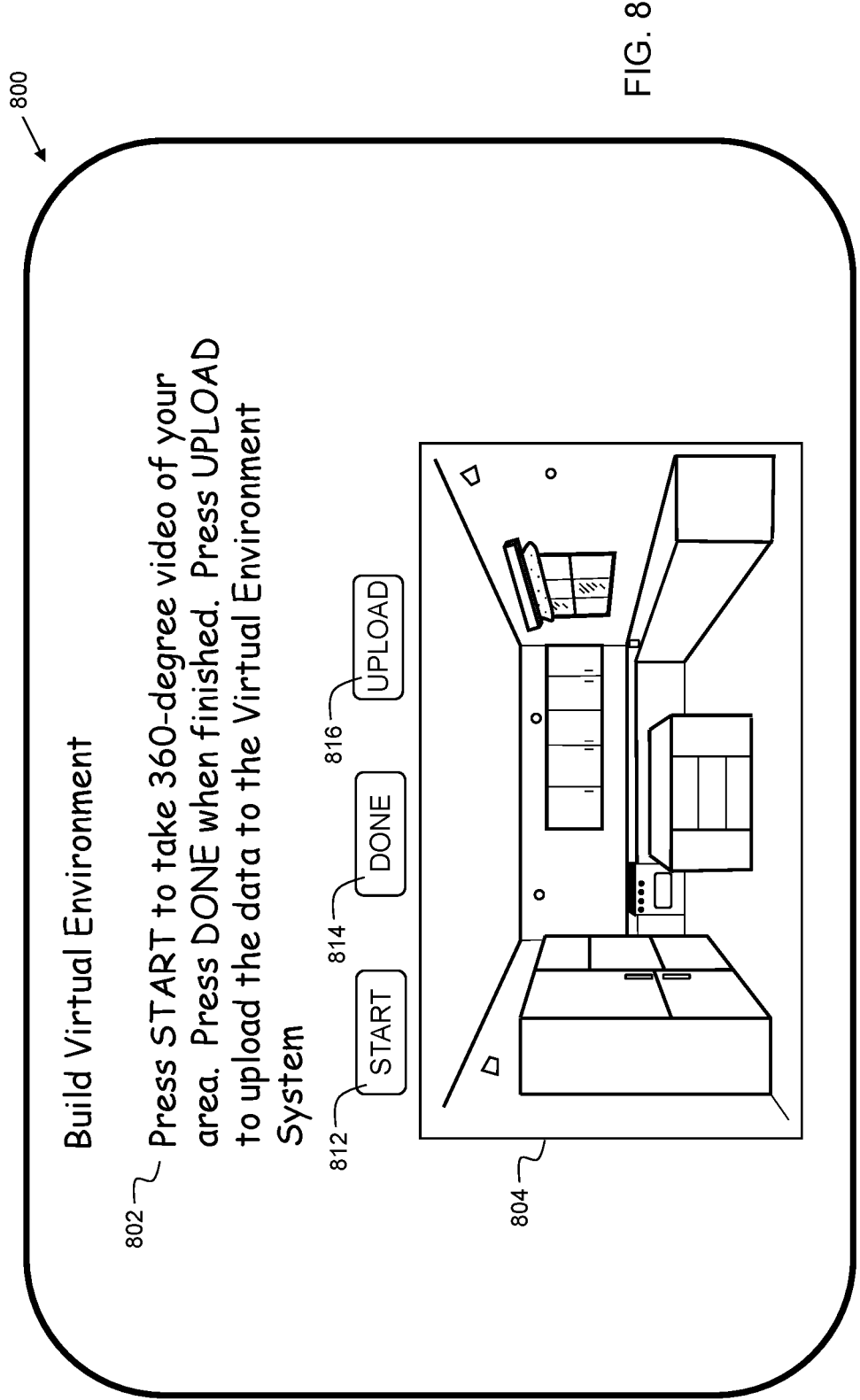
FIG. 8 is an exemplary user interface for building a virtual environment based on the physical environment.

FIG. 8 is an exemplary user interface 800 for building a virtual environment based on the physical environment. User interface 800 may be rendered using an application (app) on a smartphone, tablet computer, or other suitable device of a user. In the user interface 800, the user is instructed to acquire video of the physical environment shown in FIG. 7. The camera view 804 shows what is currently in the camera field of view. The user is provided with instructions 802 for acquiring and uploading the video. The user can press a "Start" button 812 to cause the video recording to start. The user can press a "Done" button 814 to cause the video recording to stop. The user can press an "Upload" button 816 to cause a file of the video recording to be uploaded to a system (e.g., 112 of FIG. 1) for rendering a virtual environment that is a digital twin of the physical environment of FIG. 7. By "press," it is meant using a mouse, finger, or other method.

Figure 9:
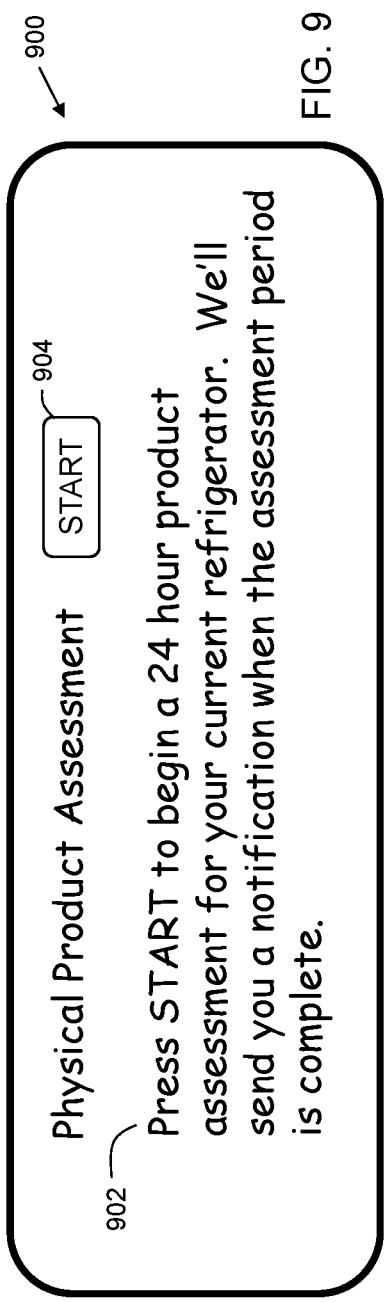
FIG. 9 is an exemplary user interface for starting a physical product assessment.

FIG. 9 is an exemplary user interface 900 for starting a physical product assessment. The user is provided with instructions in field 902. The user can press a "Start" button 904 to start an evaluation period with a first product in a physical environment.

Figure 10:
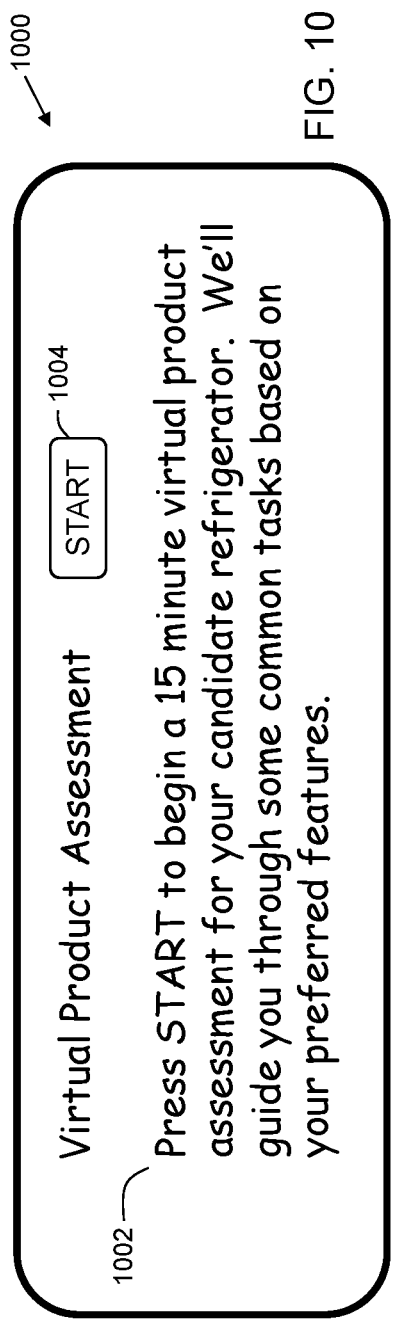
FIG. 10 is an exemplary user interface for starting a virtual product assessment.

FIG. 10 is an exemplary user interface 1000 for starting a virtual product assessment. The user is provided with instructions in field 1002. The user can press a "Start" button 1004 to start an evaluation period with a second product in a virtual environment.

Figure 11A:
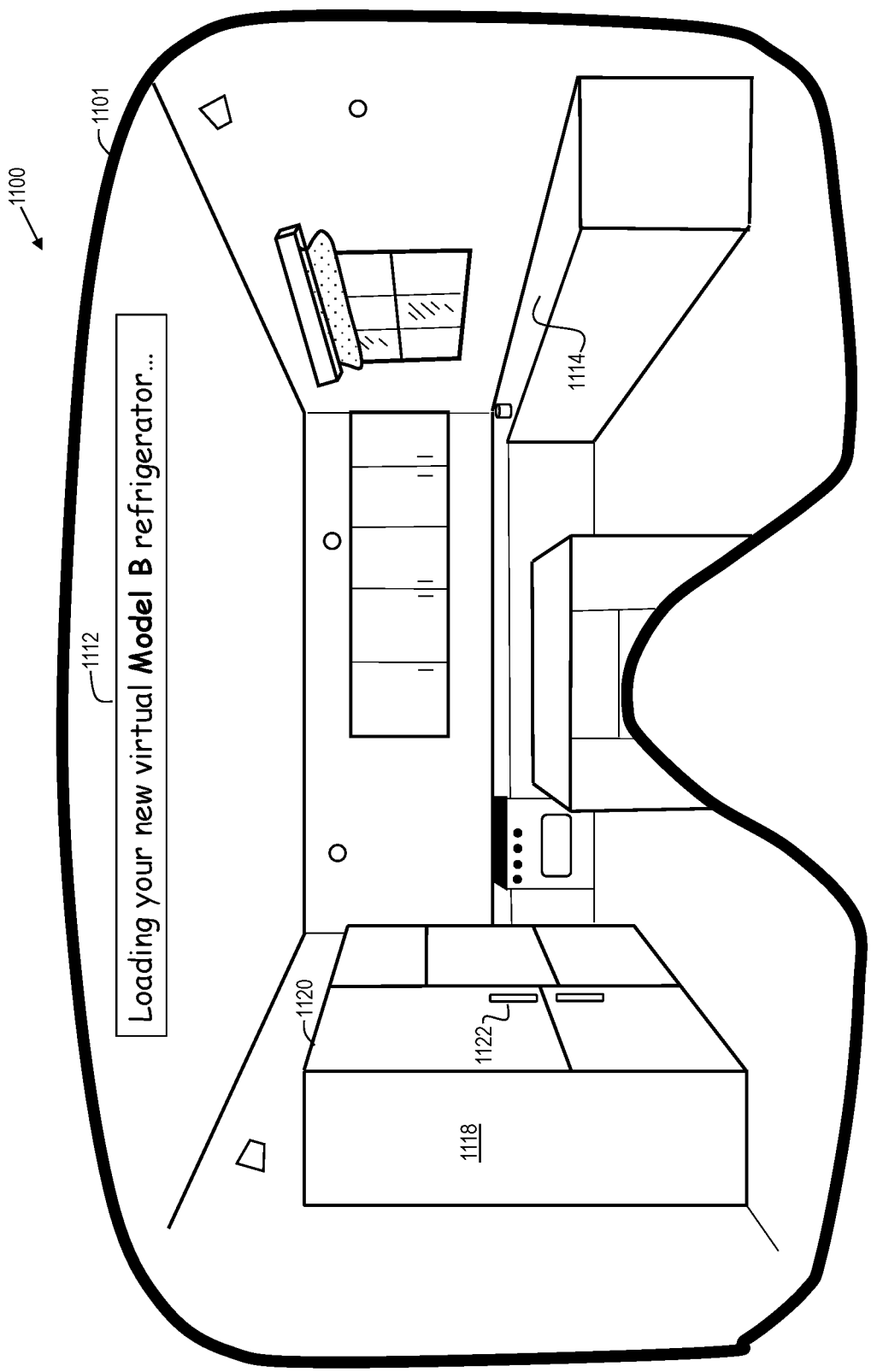
FIG. 11A is a virtual reality view of the virtual environment.

FIG. 11A is a view of the virtual environment as viewed through a VR headset. The user dons a virtual reality headset 1101 and enters a virtual environment 1100 as shown in FIG. 11A, which corresponds to the physical environment of FIG. 7. The virtual environment 1100 includes a refrigerator 1118 having a door 1120 and a handle 1122. The virtual environment 1100 also includes a counter 1114. Refrigerator 1118 is a virtual version of refrigerator 718 of the physical environment. Text field 1112 provides feedback to the user, indicating that a new virtual Model B refrigerator is being loaded into the environment.

Figure 11B:
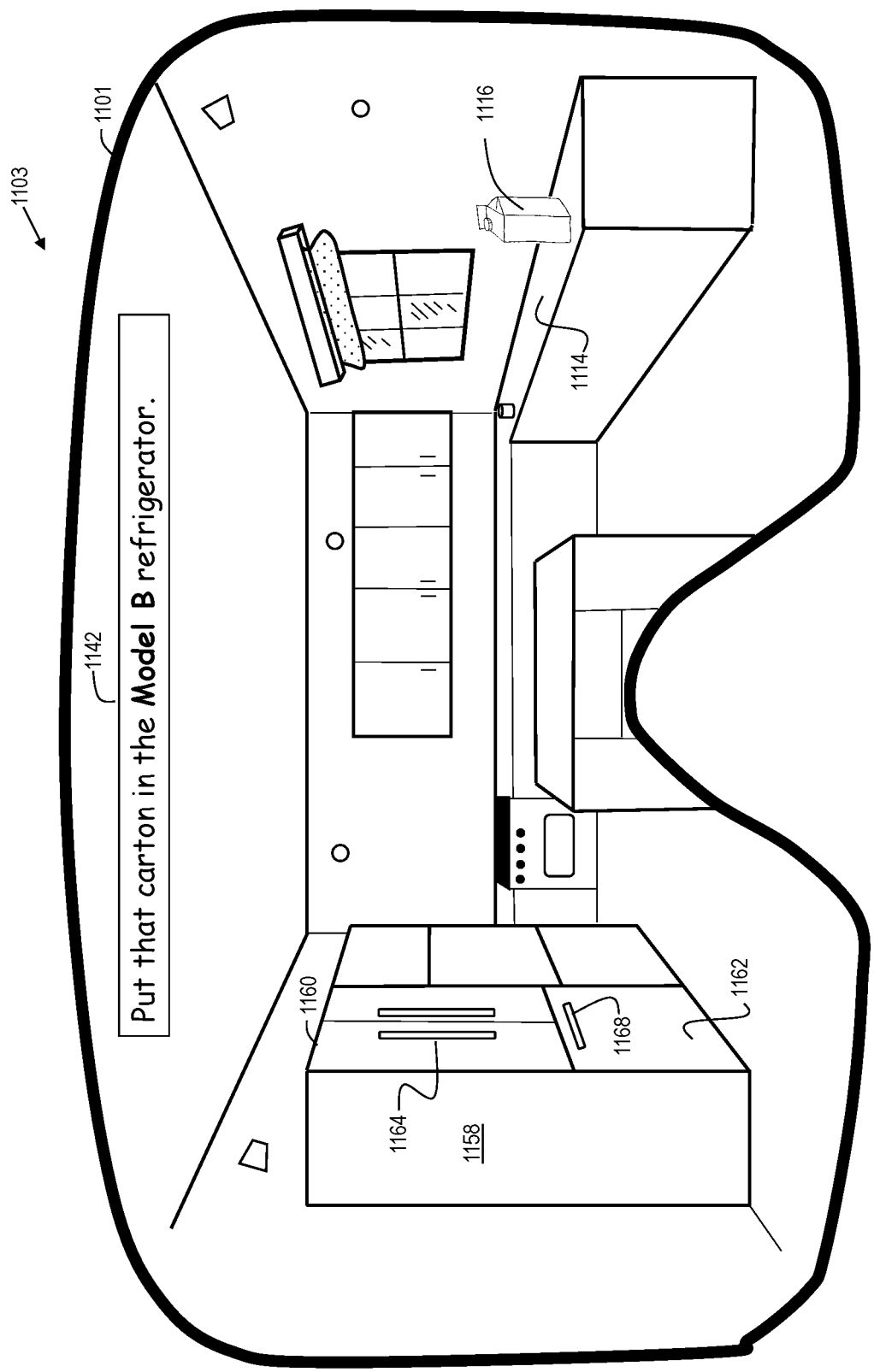
FIG. 11B is a virtual reality view of the virtual environment with a new virtual product in place of a physical product.

FIG. 11B shows an updated virtual environment 1103. New virtual refrigerator 1158 replaces refrigerator 1118 of FIG. 11A. Refrigerator 1158 is a virtual model of the Model B refrigerator selected with checkbox 624 in user interface 600 of FIG. 6. The virtual environment 1100 includes a refrigerator 1158 having a door 1160 and a handle 1164. Refrigerator 1158 also includes freezer drawer 1162 having handle 1168. Text field 1142 provides feedback to the user, indicating a task to perform. In this example, the virtual environment rendering system (VERS) 112 generates a virtual carton, indicated as 1116 on the counter 1114. The instructions in field 1142 prompt the user to place the carton 1116 in the refrigerator 1158 to perform operation of the refrigerator 1158 in a virtual environment.

Figure 11C:
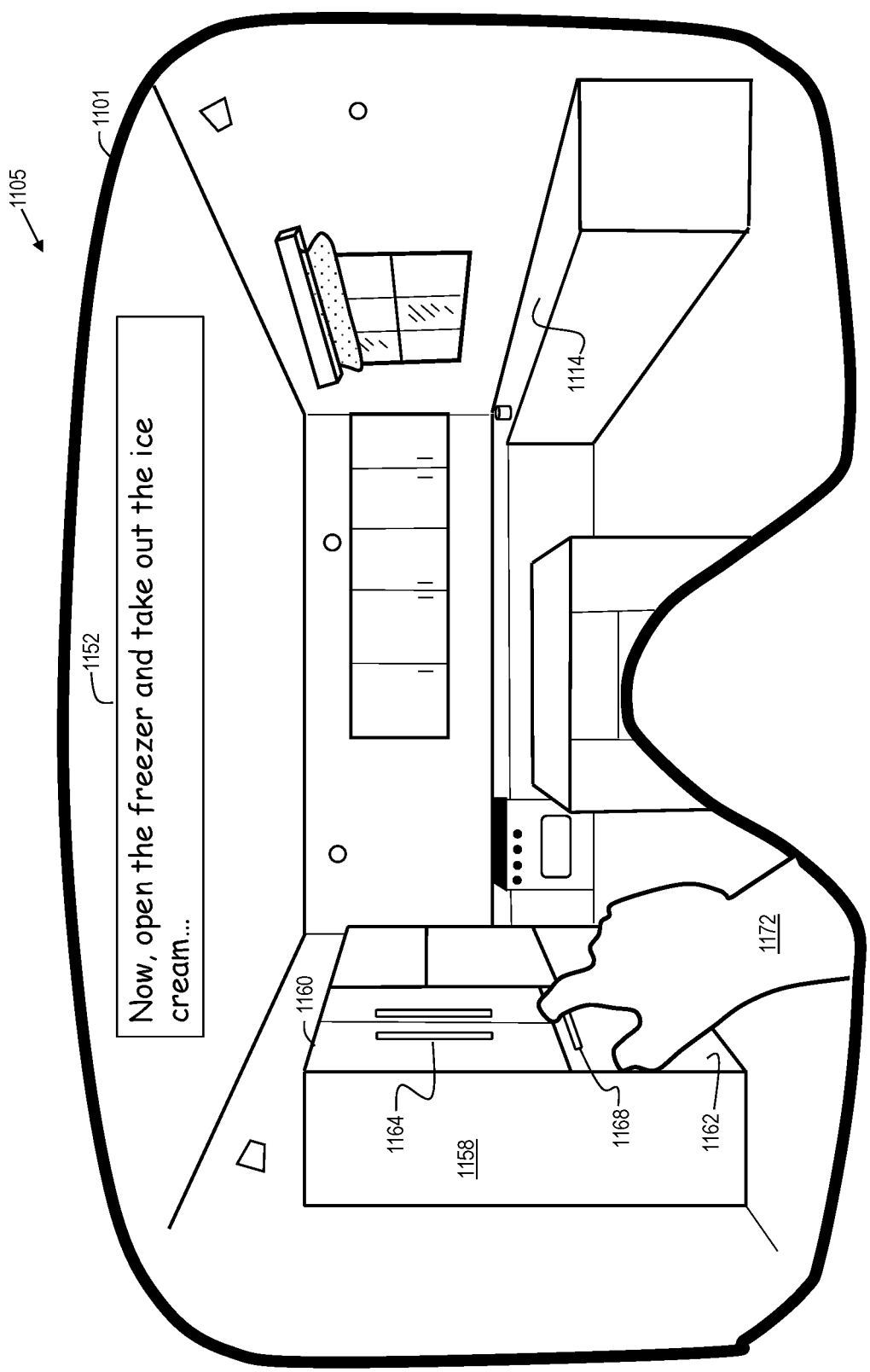
FIG. 11C is a virtual reality view of the virtual environment showing interaction with the new virtual product.

FIG. 11C shows an updated virtual environment 1105, after performing the task indicated at 1142 of FIG. 11B. The next prompt indicating a task for the user is presented in text field 1152, which is to open the freezer drawer 1162. To do so, the user may take a virtual hand 1172 and grab the handle 1168 and pull open the freezer drawer 1162. Manipulation of the virtual hand 1172 may be performed by the user manipulating his/her actual hand by using a controller that is paired to a VR headset. In some embodiments, a VR system may utilize a near field camera, and/or other suitable technology, such that the user may be able to manipulate his/her hand without the need for a hand-held controller, and control the position and configuration of virtual hand 1172.

The VR system may continue to present additional tasks for the user to perform. The presented tasks may be based on the selection of preferred features, such as those shown in column 510 of user interface 500 of FIG. 5. During the performing of tasks, biometric data, such as from a fitness tracker or smart watch worn by the user, and/or other proximal sensors, is acquired and sent to the product performance estimation system (PPES) 102 for analysis, in order to determine a product performance assessment and/or acceptance scores.

Figure 11D:
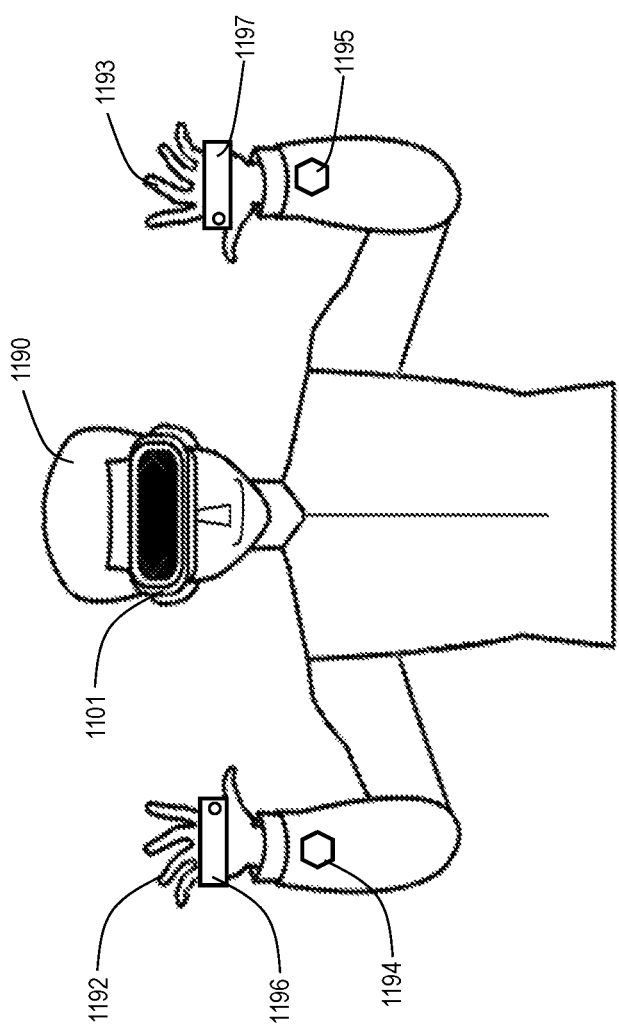
FIG. 11D shows an example of a user operating in a virtual reality environment.

FIG. 11D shows an example of a user 1190 operating in a virtual reality environment. User 1190 dons virtual reality headset 1101. The user may make gestures with his hands 1192 and/or 1193. In some embodiments, the user may wear special gloves, and/or utilize handheld controllers 1196 and 1197 to perform operations in the virtual reality environment. Optionally, one or more wearable sensors, indicated as 1194 and 1195 may be utilized to obtain various data regarding the user 1190 as he/she operates in the virtual environment. This data can include, but is not limited to, positional data, biometric data, and/or ambient environmental data.

Figure 12:
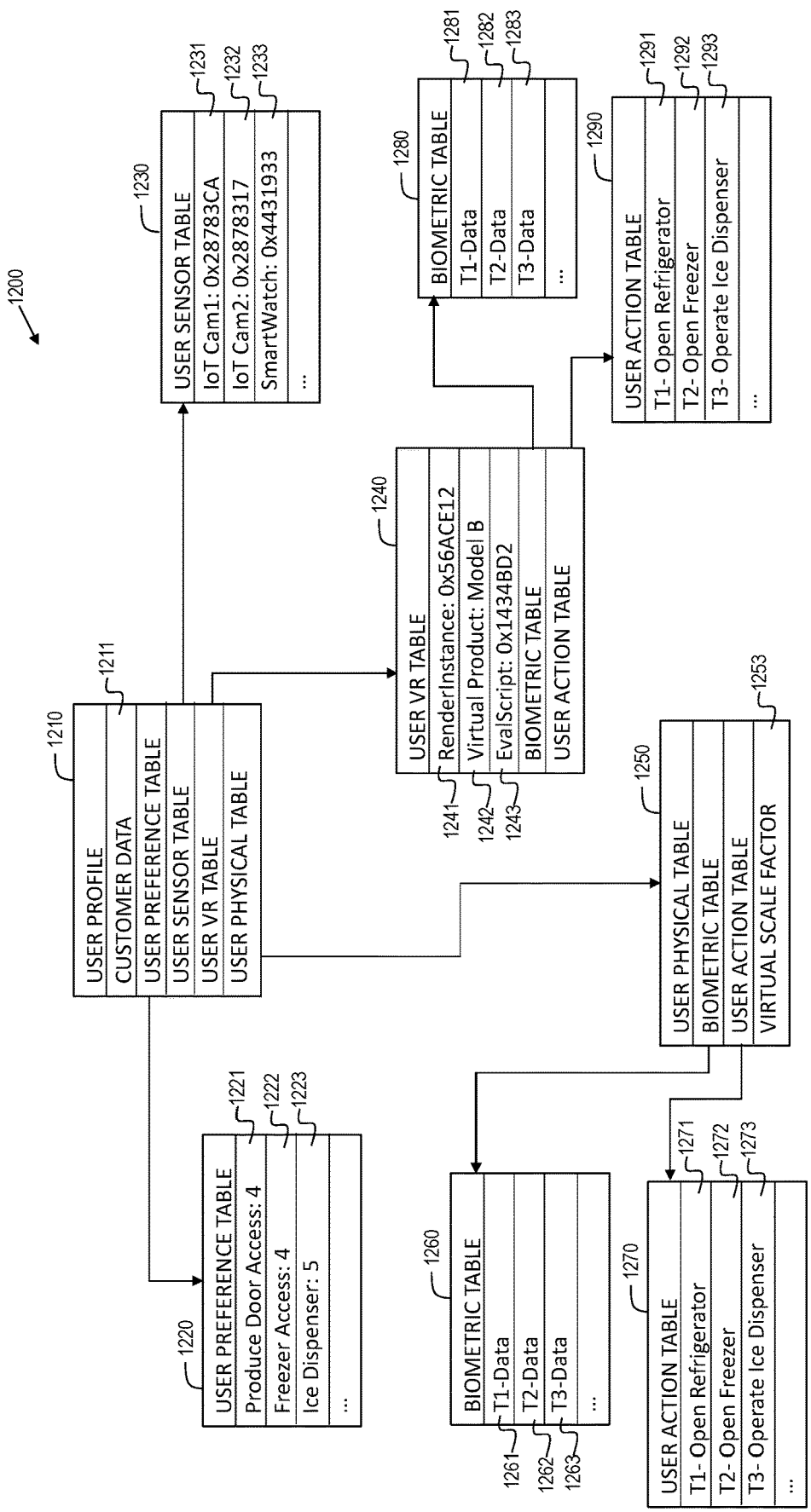
FIG. 12 shows exemplary data structures for embodiments of the present invention.

FIG. 12 shows exemplary data structures 1200 for embodiments of the present invention. Data structure 1210 is a user profile table. It can include a customer data field 1211. The customer data field 1211 may include metadata such as customer name, address, account information, and other information used for providing a virtual product performance assessment for the user. The user profile table may reference a user preference table 1220. The user preference table may include multiple preferred features for a product category. Entry 1221 includes a key value pair for the produce door access feature. Entry 1222 includes a key value pair for the freezer access feature. Entry 1223 includes a key value pair for the ice dispenser feature. While three entries are shown in user preference table 1220, in embodiments, more or fewer entries may be present in a user preferences table.

The user profile table may reference a user sensor table 1230. The user sensor table may include multiple IoT devices which can be used to provide data during a product performance assessment. In embodiments, each entry may include a device name, and a device unique identifier. The device unique identifier may be a MAC address, ipv6 address, or other suitable address. Entry 1231 includes information for a first IoT camera. Entry 1232 includes information for a second IoT camera. Entry 1233 includes information for a smart watch. While three entries are shown in user sensor table 1230, in embodiments, more or fewer entries may be present in a user sensor table.

The user profile table may reference a user VR table 1240. The user VR table contains information obtained within a virtual environment. The user VR table 1240 may include a RenderInstance 1241. In embodiments, the RenderInstance 1241 is a value that is unique within the virtual environment rendering system (VERS) 112, which can serve as a handle for access to functionality within the virtual environment rendering system (VERS) 112. The user VR table 1240 may include a virtual product entry 1242 to indicate which product is undergoing an assessment. The user VR table 1240 may include a pointer to an EvalScript 1243. The EvalScript is an evaluation script that may be generated by the product performance estimation system (PPES) 102, and may be executed by the virtual environment rendering system (VERS) 112. The EvalScript may be a script that includes one or more tasks for a user to perform as part of a product assessment in a virtual environment. The EvalScript may be written in a known scripting language such as Python, Perl, Lua, or the like, or in a custom scripting language.

Returning again to the refrigerator example, the EvalScript may include tasks such as placing an item in a refrigerator (FIG. 11B), removing an item from the freezer (FIG. 11C), and so on. In embodiments, the EvalScript may be based on preferred features for a product category (such as depicted in FIG. 5). For features indicated to have high importance, the EvalScript includes tasks for those features. For features indicated to have low importance, the EvalScript omits tasks for those features, thereby saving evaluation time, and also reducing the demand for computation resources for the virtual environment rendering system (VERS) 112, as well as reducing network bandwidth demands.

The user VR table 1240 may include a biometric table 1280. The biometric table 1280 may contain multiple entries. Each entry may include a timestamp, and a data value from one or more sensors, such as IoT sensors (127 of FIG. 1). Biometric table 1280 shows three entries (1281, 1282, and 1283) for data collected while a user is interacting in a virtual environment. While three entries are shown in biometric table 1280, in embodiments, more or fewer entries may be present in a biometric table.

The user VR table 1240 may include a user action table 1290. The user action table 1290 may contain multiple entries. Each entry may include a timestamp, and an action identifier. User action table 1290 shows three entries (1291, 1292, and 1293). Entry 1291 contains a timestamp for time T1, and an action of Open Refrigerator. Entry 1292 contains a timestamp for time T2, and an action of Open Freezer. Entry 1293 contains a timestamp for time T3, and an action of Operate Ice Dispenser. While three entries are shown in user action table 1290, in embodiments, more or fewer entries may be present in a user action table. The timestamps in the user action table can be correlated with the timestamps in the biometric table 1280, in order to correlate biometric activity with user actions in the user action table 1290.

The user profile table may reference a user physical table 1250. The user physical table contains information obtained within a physical environment. The user physical table 1250 may include a biometric table 1260. The biometric table 1260 may contain multiple entries. Each entry may include a timestamp, and a data value from one or more sensors, such as IoT sensors (127 of FIG. 1). Biometric table 1260 shows three entries (1261, 1262, and 1263) for data collected while a user is interacting in a physical environment. While three entries are shown in biometric table 1260, in embodiments, more or fewer entries may be present in a biometric table.

The user physical table 1250 may include a user action table 1270. The user action table 1270 may contain multiple entries. Each entry may include a timestamp, and an action identifier. User action table 1270 shows three entries (1271, 1272, and 1273). Entry 1271 contains a timestamp for time T1, and an action of Open Refrigerator. Entry 1272 contains a timestamp for time T2, and an action of Open Freezer. Entry 1273 contains a timestamp for time T3, and an action of Operate Ice Dispenser. While three entries are shown in user action table 1270, in embodiments, more or fewer entries may be present in a user action table. The timestamps in the user action table can be correlated with the timestamps in the biometric table 1260, in order to correlate biometric activity with user actions in the user action table 1270. In embodiments, the data structures 1200 shown in FIG. 12 may be stored in database 114.

Figure 13:
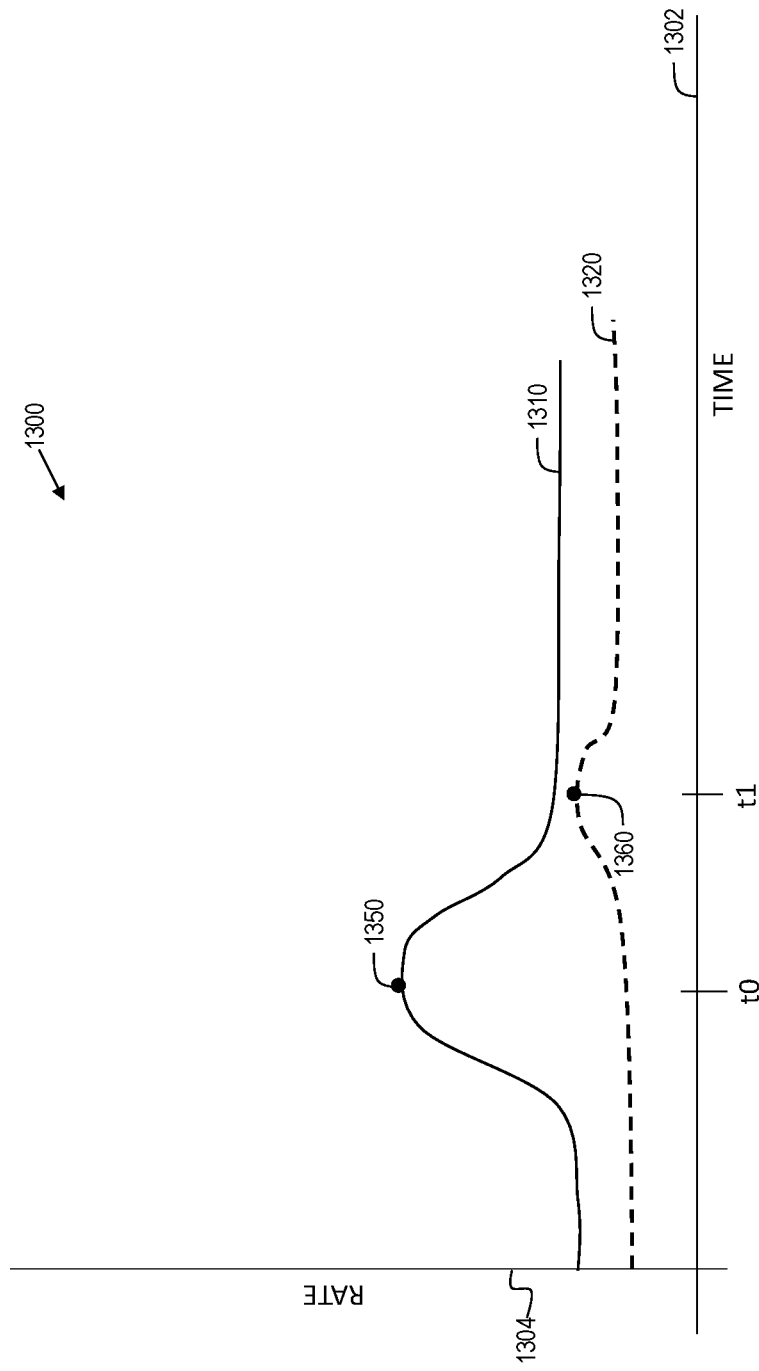
FIG. 13 shows a graph of biometric data.

FIG. 13 shows a graph 1300 of biometric data. Graph 1300 includes a curve 1310 representing heart rate for a user during a product assessment in a physical environment. Graph 1300 includes a curve 1320 representing respiration rate (breathing rate) for a user during a product assessment in a physical environment. Curve 1310 has peak 1350, which occurs at time t0. Curve 1320 has peak 1360, which occurs at time t1. In embodiments, a computer-implemented process analyzes each available curve that represents biometric data over a time period. While two curves are shown in FIG. 13, in practice, there may be more or fewer curves. The computer-implemented process may determine one or more local maxima (peaks) and determine the time associated with each peak. The peak biometric values along the Y-axis 1304, along with the corresponding time along the X-axis 1302, may be stored in a biometric table such as biometric table 1260 in FIG. 12. In embodiments, the time on X-axis 1302 may be measured in seconds, and the rate indicated on Y-axis 1304 may be in cycles per second.

Figure 14A:
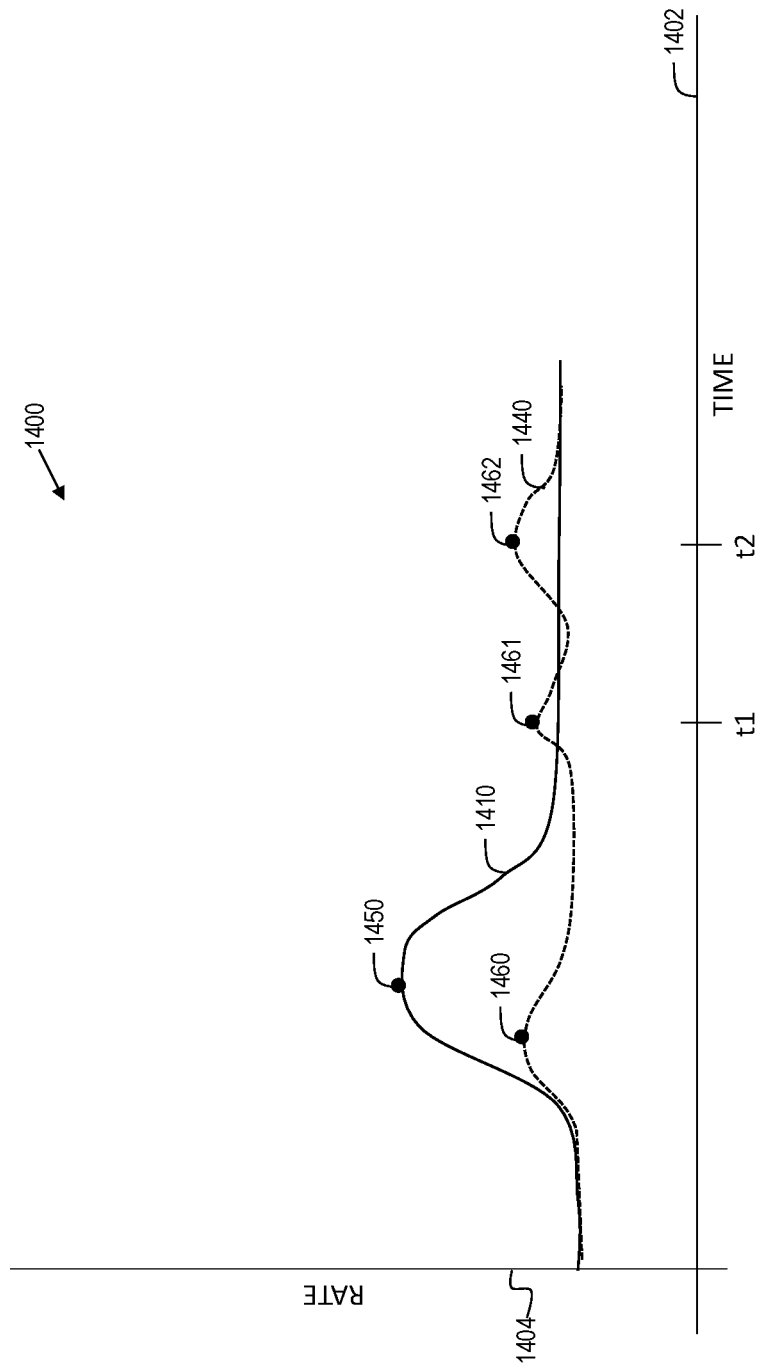
FIG. 14A shows a graph of biometric data from physical and virtual environments.

FIG. 14A shows a graph of biometric data from physical and virtual environments. Graph 1400 includes a curve 1410 representing heart rate for a user during a product assessment in a physical environment. Graph 1400 includes a curve 1440 representing heart rate for a user during a product assessment in a virtual environment. In embodiments, the data used to generate curve 1410 and the data used to generate curve 1440 may be based on biometric data obtained from the same person. In embodiments, the curves 1410 and 1440 may be for similar tasks. Returning again to the refrigerator example, the curve 1410 may include data for opening a freezer door of a refrigerator in a physical environment. Similarly, the curve 1440 may include data for opening a freezer door of a refrigerator in a virtual environment, such as depicted in FIG. 11C. Curve 1410 has peak 1450. Curve 1440 has three local maxima peaks, indicated as 1460, 1461, and 1462. Each peak is associated with a time on the time axis 1402, and has a corresponding value on the data (rate) axis 1404. For example, peak 1461 occurs at time t1, and peak 1462 occurs at time t2.

Figure 14B:
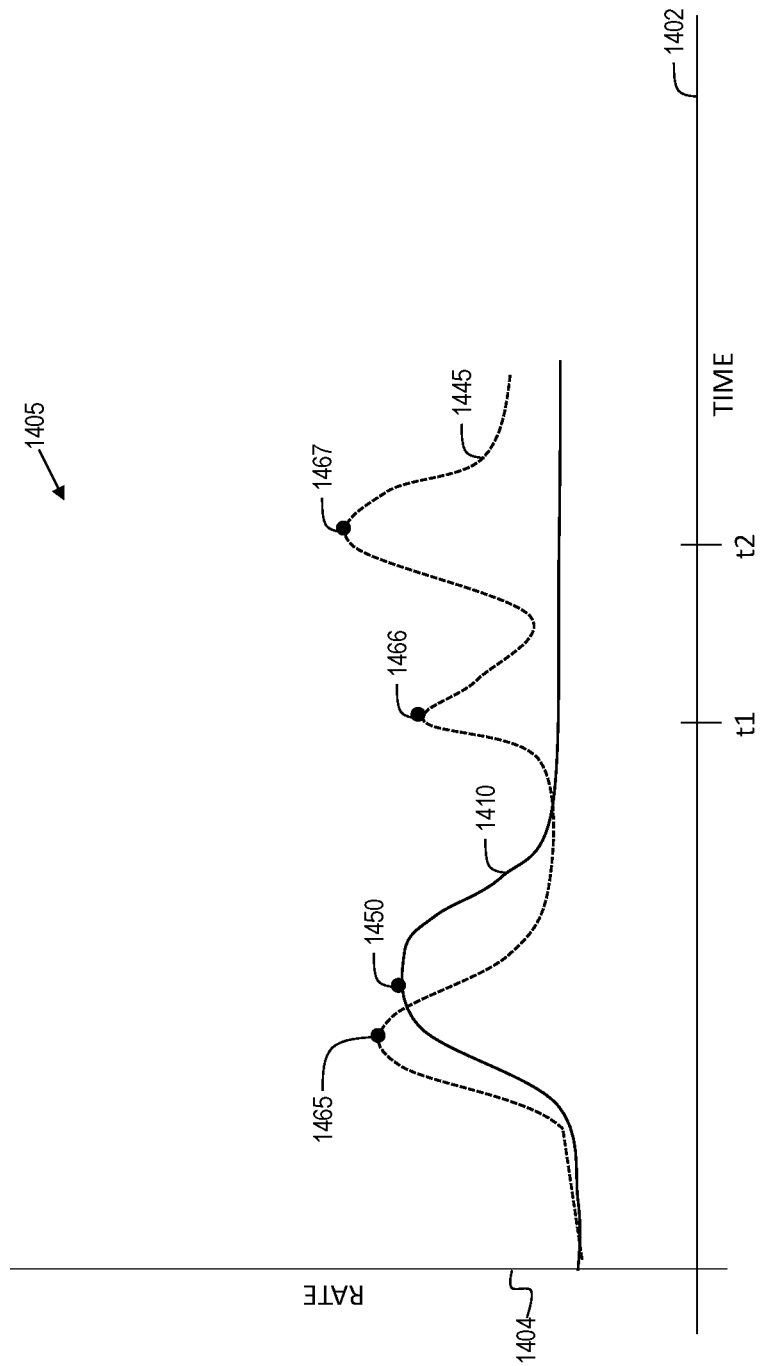
FIG. 14B shows a graph of biometric data from physical and virtual environments with scaling applied.

FIG. 14B shows a graph 1405 of biometric data from physical and virtual environments with scaling applied to the biometric data obtained from a virtual environment. Graph 1405 includes the curve 1410 representing heart rate for a user during a product assessment in a physical environment. This is similar to the curve 1410 shown in FIG. 14A. Graph 1405 includes the curve 1445 representing heart rate for a user during a product assessment in a virtual environment. In embodiments, the curves 1410 and 1445 may be for similar tasks. Returning again to the refrigerator example, the curve 1410 may include data for opening a freezer door of a refrigerator in a physical environment. Similarly, the curve 1445 may include data for opening a freezer door of a refrigerator in a virtual environment, such as depicted in FIG. 11C. The curve 1445 is a scaled version of the curve 1440 of FIG. 14A.

In some embodiments, the biometric data obtained from a user performing a task in a virtual environment may be scaled prior to comparing it with biometric data obtained from a user performing a task in a physical environment. The reason for doing this is that operating a physical product in a physical environment may require more physical exertion than operating a comparable virtual product in a virtual environment.

Returning again to the refrigerator example, moving a physical freezer drawer may cause a heart rate to elevate more than when the same user operates a virtual freezer drawer in a virtual environment. For instance, the physical freezer drawer may provide 10 pounds of resistance before it will open, while no such resistance may be provided by the virtual freezer drawer. Disclosed embodiments apply a scale factor to the biometric data collected from users while operating in a virtual environment so that the two sets of data can be more accurately compared.

In embodiments, the scale factor may be determined based on product specifications for products in the physical world. For example, the amount of resistance for various actions such as opening doors and drawers of a refrigerator may be stored in the database 114. Based on the resistance, a scaling factor may be applied to the biometric data obtained from users interacting in a virtual environment.

In some embodiments, the scale factor varies proportionally to the amount of resistance. Thus, a higher resistance results in a higher scale factor. Comparing curve 1445 with curve 1440 of FIG. 14A, it can be seen that the peaks 1465, 1466, and 1467 of curve 1445, after scaling, are of comparable height to the peak 1450 of curve 1410.

Embodiments can include applying a scale factor to the biometric data collected for the user during the second interaction period. While rate is shown as the Y-axis in the graphs of FIGS. 13, 14A and 14B, in practice, other biometric parameters may be represented on a Y-axis of a graph, such as body temperature, blood pressure, etc.

Figure 15:
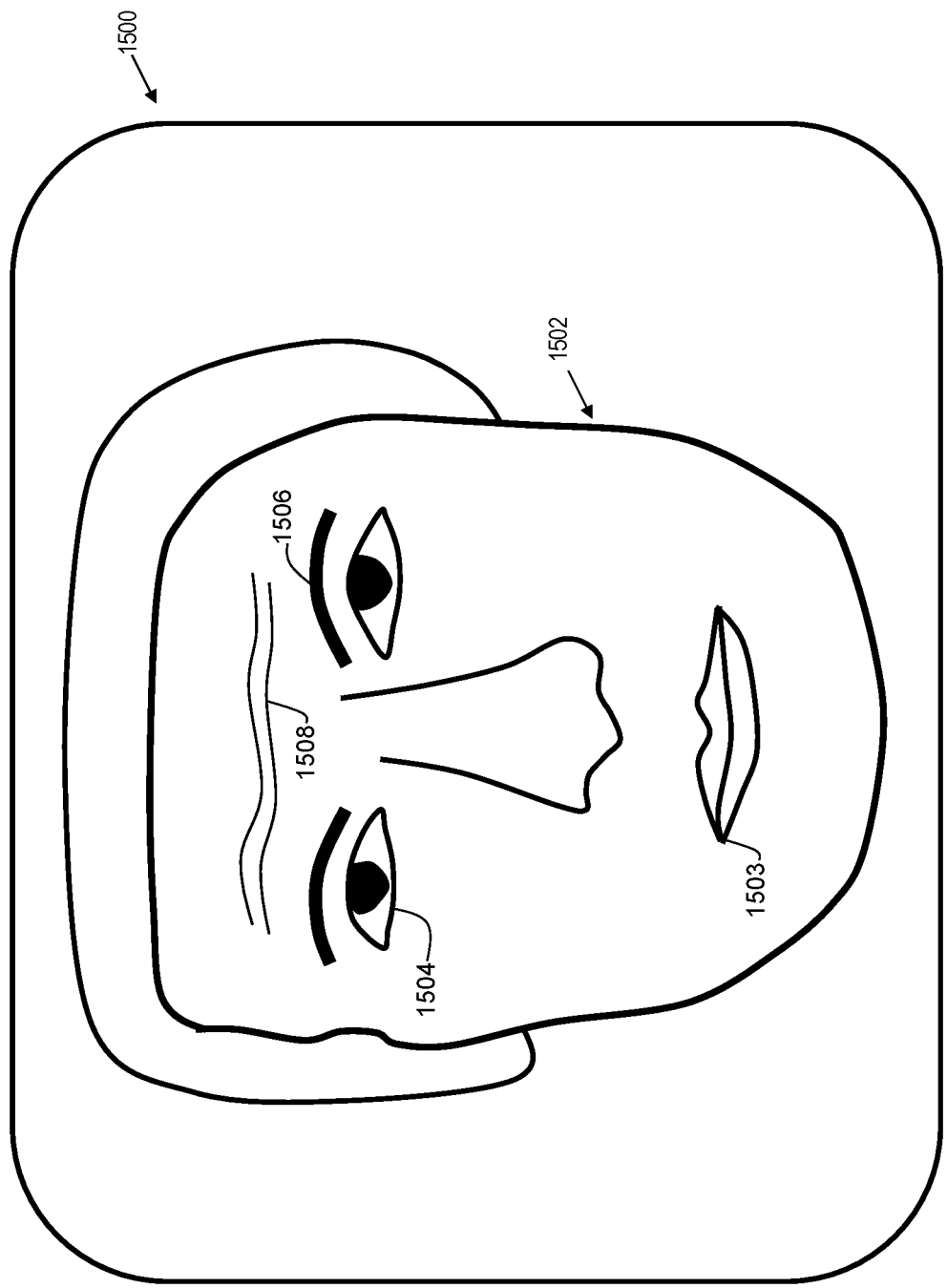
FIG. 15 shows exemplary facial image data used with embodiments of the present invention.

FIG. 15 shows exemplary facial image data 1500 used in accordance with embodiments of the present invention. Human face 1502 indicates a sampling of action unit locations used in sentiment assessment. Human face 1502 includes various facial features such as eyes 1504, lip corners 1503, eyebrows 1506, and forehead 1508. These are just a small sample of the various facial features that may be monitored/analyzed to determine facial expression, and thus, current mood or sentiment of a user participating in a product assessment in a physical and/or virtual environment.

In some embodiments, the mood of a user is monitored to determine level of engagement. In some embodiments, performing a mood analysis comprises identifying one or more action units in the face image. The Facial Action Coding System (FACS) is a system to classify human facial movements by their appearance on the face. Movements of individual facial muscles are encoded by FACS from changes in facial appearance. Using FACS, embodiments can implement a computerized method to analyze a wide variety of anatomically possible facial expressions, deconstructing them into the specific Action Units (AUs).

Using action units, the mood or sentiment of a user perform a product assessment may be derived if a user-facing camera captures images of the user. For example, AU12 (Lip Corner Puller) is associated with movement of the zygomaticus muscles during a smile. AU02 (Outer Brow Raiser) is associated with movement of the frontalis muscles during a look of surprise. A variety of action units may be combined to infer a given facial expression. Thus, as a user looks at his/her electronic communication device (e.g., tablet computer), the user-facing camera on the device can acquire one or more images of the user. Embodiments can perform an action unit (AU) identification process, and infer a mood of the user from the one or more images. If a user appears to be smiling, it may be inferred that s/he is engaged and likes the product. If a participant is frowning, it may be inferred that s/he is dissatisfied with the product.

In some embodiments, eye gaze is monitored instead of, or in addition to, the FACS technique. If the participant's eyes are gazing away from the product being assessed for an extended period of time (e.g., 15 seconds), it is inferred that s/he is bored and unengaged. In embodiments, the first acceptance score is based on facial image data of the user. In embodiments, the facial image data includes one or more action units.

Figure 16:
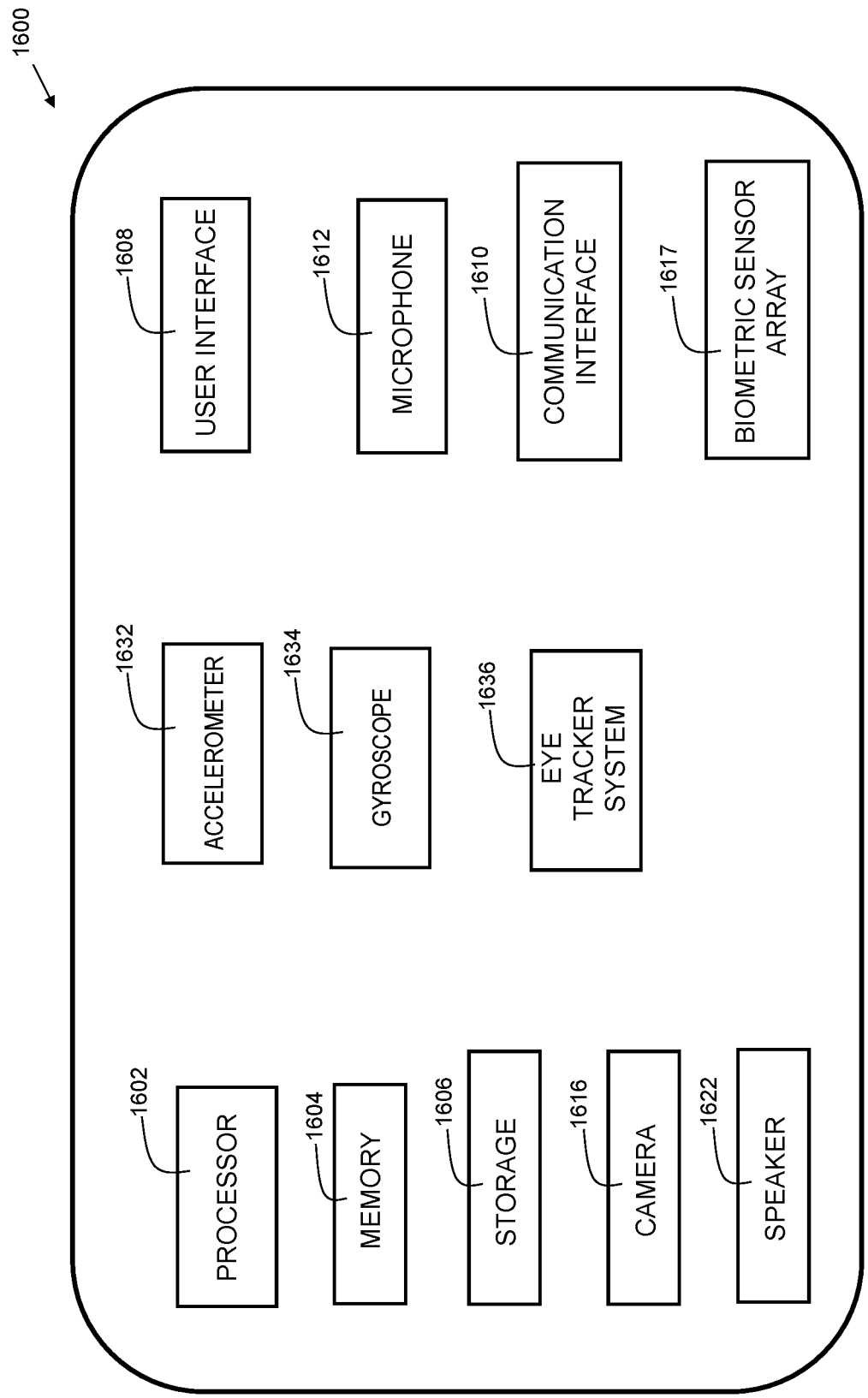
FIG. 16 shows an exemplary client device in accordance with embodiments of the present invention.

FIG. 16 shows a block diagram of a client device 1600 in accordance with disclosed embodiments. In embodiments, client device 1600 is capable of providing a virtual reality (VR) experience. Client device 1600 may comprise a VR headset. In other embodiments, client device 1600 may comprise a mobile phone that can be inserted into a VR viewer (e.g., Google Cardboard®) to provide a virtual reality experience for a user. In embodiments, this may represent a client device such as 116 of FIG. 1. Device 1600 includes a processor 1602, which is coupled to a memory 1604. Memory 1604 may include dynamic random-access memory (DRAM), static random-access memory (SRAM), magnetic storage, and/or a read only memory such as flash, EEPROM, optical storage, or other suitable memory. In some embodiments, the memory 1604 may not be a transitory signal per se.

Device 1600 may further include storage 1606. In embodiments, storage 1606 may include one or more magnetic storage devices such as hard disk drives (HDDs). Storage 1606 may additionally include one or more solid state drives (SSDs).

Device 1600 may, in some embodiments, include a user interface 1608. This may include a display, keyboard, and/or other suitable interface. In some embodiments, the display may be touch-sensitive.

The device 1600 further includes a communication interface 1610. The communication interface 1610 may include a wireless communication interface that includes modulators, demodulators, and antennas for a variety of wireless protocols including, but not limited to, Bluetooth™, Wi-Fi, and/or cellular communication protocols for communication over a computer network and/or operation with an indoor positioning system (IPS). In embodiments, instructions are stored in memory 1604. The instructions, when executed by the processor 1602, cause the electronic computing device 1600 to execute operations in accordance with disclosed embodiments.

Device 1600 may further include a microphone 1612 used to receive audio input. The audio input may include speech utterances. The audio input may be digitized by circuitry within the device 1600. The digitized audio data may be analyzed for phonemes and converted to text for further natural language processing. In some embodiments, the natural language processing may be performed onboard the device 1600. In other embodiments, all or some of the natural language processing may be performed on a remote computer.

Device 1600 may further include camera 1616. In embodiments, camera 1616 may be used to acquire still images and/or video images by device 1600. Device 1600 may further include one or more speakers 1622. In embodiments, speakers 1622 may include stereo headphone speakers, and/or other speakers arranged to provide an immersive sound experience.

Device 1600 may further include biometric sensor array 1617. In embodiments, the biometric sensor array may include a heart rate sensor, respiration rate sensor, perspiration sensor, muscle tension sensor, blood pressure sensor, and/or other suitable sensors. The data from these sensors may be used for product performance estimation in accordance with disclosed embodiments.

Device 1600 may further include an accelerometer 1632 and/or gyroscope 1634. The accelerometer 1632 and/or gyroscope 1634 may be configured and disposed to track movements of a user, such as head and/or hand movements while donning wearable computing devices such as virtual reality headsets and/or hand-held remote-control devices in communication with a virtual reality system.

Device 1600 may further include an eye tracker system 1636. The eye tracker system 1636 may include one or more cameras configured and disposed to track eye movement of a user, and render portions of a virtual environment based on eye movement.

As can now be appreciated, disclosed embodiments enable product performance estimation. A first product is evaluated in a physical environment by a user. A second product is evaluated in a virtual environment by the user. The second product may be a candidate product that a user is contemplating purchasing. Biometric data from a user is obtained while using the first product in the physical environment, and from using the second product in the virtual environment. From this biometric data, an estimation of product performance of the second product in a physical environment is obtained. This enables users to "try" products in a virtual environment before purchasing them or interacting with them in a physical environment. For major appliances, such as refrigerators, dishwashers, washers, and dryers, it is usually not practical to try these extensively in a physical environment prior to purchase. With disclosed embodiments, a user can try products in a virtual environment. Based on collected biometric data, an estimated acceptance score is generated. The estimated acceptance score is a measure of estimated satisfaction with the product a user may experience in a physical environment. While the examples used throughout this disclosure pertained to a refrigerator, a wide variety of other products and/or services may be assessed using disclosed embodiments. These can include other appliances, tools, automobiles, and/or other products and/or services well suited for evaluation in a virtual environment. Thus, disclosed embodiments provide improvements in the technical field of product performance estimation.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for product performance estimation, the computer-implemented method comprising:

collecting, from first biometric sensors, biometric data for a user during a first interaction period, wherein the first interaction period includes the user using a first product in a physical environment, wherein the first product is a physical device that has a core function;

collecting sensor data, regarding the physical environment, using sensor devices located in the physical environment, wherein the sensor data includes image data of the physical environment;

performing, using a machine learning system, image analysis on the sensor data to identify the first product in the physical environment,
wherein objects, within the image data, are classified based on the machine learning system interfacing with a virtual environment rendering system;

generating, using the sensor data and using one or more first computing devices of the virtual environment rendering system, a virtual environment corresponding to the physical environment, wherein the virtual environment is generated based on performing the image analysis and object classification using the machine learning system, wherein the virtual environment is a digital twin of the physical environment;

modifying, using the one or more first computing devices, the virtual environment by replacing the first product with a virtual representation of a second product different than the first product, wherein the virtual environment is modified using an image processing technique;

collecting, from second biometric sensors, biometric data for the user using the virtual representation of the second product and the virtual object in the virtual environment during a second interaction period;

computing, by one or more second computing devices, a first acceptance score for the first product based on the collected biometric data from the first interaction period;

computing, by the one or more second computing devices, a second acceptance score for the second product based on the collected biometric data from the second interaction period;

estimating, by the one or more second computing devices, a third acceptance score that indicates how the second product will perform in the physical environment based on the first acceptance score and the second acceptance score; and providing to the user, by the one or more second computing devices, a recommendation that indicates how satisfied the user will be using the second product in the physical environment based on the third acceptance score.

2. The method of claim 1, wherein estimating the third acceptance score includes computing a difference between the first acceptance score and the second acceptance score.

3. The method of claim 1, wherein computing the first acceptance score comprises computing the first acceptance score based on detecting, using the biometric data from the first biometric sensors, a change in heart rate during the first interaction period, and wherein computing the second acceptance score comprises computing the second acceptance score based on detecting, using the biometric data from the second biometric sensors, a change in heart rate during the second interaction period.

4. The method of claim 1, further comprising applying a scale factor, which compensates for a difference between performing a task in a physical environment and performing the task in a virtual environment, to the biometric data collected for the user during the second interaction period.

5. The method of claim 1, wherein computing the first acceptance score comprises computing the first acceptance score based on detecting, using the biometric data from the first biometric sensors, a change in respiration rate during the first interaction period, and wherein computing the second acceptance score comprises computing the second acceptance score based on detecting, using the biometric data from the second biometric sensors, a change in respiration rate during the second interaction period.

6. The method of claim 1, further comprising:
collecting image data of a face of the user during the second interaction,
wherein the image data of the face includes one or more action units.

7. The method of claim 1, further comprising:
obtaining a set of data from one or more cameras or one or more microphones in the physical environment; and
generating the digital twin corresponding to the physical environment based on the set of data.

8. The method of claim 1, wherein the first acceptance score is based on audio data of the user.

9. The method of claim 8, wherein the audio data includes sound level data.

10. The method of claim 8, further comprising:
performing, using the one or more second computing devices, a speech-to-text process on the audio data to generate text data,
wherein performing the speech-to-text process comprises analyzing the audio data using a natural language processing system provided by a machine learning system; and
performing, using the one or more second computing devices, a sentiment analysis on the text data.

11. A computer-implemented method for product performance estimation, the computer-implemented method comprising:

collecting, from first biometric sensors, biometric data for a user during a first interaction period, wherein the first interaction period includes the user using preferred features of a first product in a physical environment, wherein the first product is a first physical device of a plurality of physical devices in a product category;

collecting sensor data, regarding the physical environment, from sensor devices located in the physical environment, wherein the sensor data includes image data of the physical environment;

performing, using a machine learning system, image analysis on the sensor data to identify the first product in the physical environment,
wherein objects, within the image data, are classified based on the machine learning system interfacing with a virtual environment rendering system;

generating, using the sensor data and using one or more first computing devices of the virtual environment rendering system, a virtual environment corresponding to the physical environment,
wherein the virtual environment is generated based on performing the image analysis and object classification using the machine learning system,
wherein the virtual environment is a digital twin of the physical environment;

modifying, using the one or more first computing devices, the virtual environment by replacing the first product with a virtual representation of a second product different than the first product, wherein the virtual environment is modified using an image processing technique, and wherein the second product is a second physical device of the plurality of physical devices;

collecting, from second biometric sensors, biometric data for the user during a second interaction period, wherein the second interaction period includes the user using preferred features of the virtual representation of the second product in the virtual environment;

computing, by one or more second computing devices, a first acceptance score for the first product based on the collected biometric data from the first interaction period;

computing, by the one or more second computing devices, a second acceptance score for the second product based on the collected biometric data from the second interaction period;

estimating, by the one or more second computing devices, a third acceptance score that indicates how the second product will perform in the physical environment based on the first acceptance score and the second acceptance score; and providing to the user, by the one or more second computing devices, a recommendation that indicates how satisfied the user will be using the second product in the physical environment based on the third acceptance score.

12. The method of claim 11, wherein estimating the third acceptance score includes computing a difference between the first acceptance score and the second acceptance score.

13. The method of claim 11, wherein the first acceptance score is based on change in heart rate during the first interaction period, and the second acceptance score is based on change in heart rate during the second interaction period.

14. The method of claim 11, further comprising:
applying, by the one or more second computing devices, a scale factor, which compensates for a difference in physical exertion between performing a task in a physical environment and performing the task in a virtual environment, to the biometric data collected for the user during the second interaction period; and
computing the second acceptance score after applying the scale factor.

15. The method of claim 11, wherein the first acceptance score is based on change in respiration rate during the first interaction period, and the second acceptance score is based on change in respiration rate during the second interaction period.

16. The method of claim 11, wherein the first acceptance score is based on facial image data of the user.

17. The method of claim 16, wherein the facial image data includes one or more action units.

18. The method of claim 11, wherein the first acceptance score is based on audio data of the user.

19. The method of claim 18, wherein the audio data includes sound level data.

20. The method of claim 18, further comprising:
performing a speech-to-text process on the audio data to generate text data; and
performing a sentiment analysis on the text data.

21. A system comprising:
one or more processors;
a memory coupled to the one or more processors, the memory containing instructions, that when executed by the one or more processors, cause one or more devices to:
collect, from first biometric sensors, biometric data for a user during a first interaction period, wherein the first interaction period includes the user using a first product in a physical environment;
collect sensor data, regarding the physical environment, using sensor devices located in the physical environment, wherein the sensor data includes image data of images of the physical environment;
receive, from a machine learning system, a result of image analysis on the sensor data to identify the first product in the physical environment, wherein objects, within the image data, are classified based on the machine learning system interfacing with a virtual environment rendering system;
generate, using the sensor data, a virtual environment corresponding to the physical environment, wherein the virtual environment is generated based on the result of the image analysis and object classification performed by the machine learning system, and wherein the virtual environment is a digital twin of the physical environment;
modify the virtual environment by replacing the first product with a virtual representation of a second product different than the first product, wherein the virtual environment is modified using an image processing technique;
collect, from second biometric sensors, biometric data for the user during a second interaction period, wherein the second interaction period includes the user using the virtual representation of the second product in the virtual environment;
compute a first acceptance score for the first product based on the collected biometric data from the first interaction period;
compute a second acceptance score for the second product based on the collected biometric data from the second interaction period;
estimate a third acceptance score that indicates how the second product will perform in the physical environment based on the first acceptance score and the second acceptance score; and
provide the user a recommendation that indicates how satisfied the user will be using the second product in the physical environment based on the third acceptance score.

22. The system of claim 21 wherein the memory further comprises instructions, that when executed by the one or more processors, cause the one or more devices to estimate the third acceptance score by computing a difference between the first acceptance score and the second acceptance score.

23. The system of claim 21 wherein the memory further comprises instructions, that when executed by the one or more processors, cause the one or more devices to apply a scale factor, which compensates for a difference between performing a task in a physical environment and performing the task in a virtual environment, to the biometric data collected for the user during the second interaction period.

24. A computer program product for computing devices comprising computer readable storage media having program instructions embodied therewith, the program instructions executable by processors to cause the computing devices to:
collect, from first biometric sensors, biometric data for a user during a first interaction period, wherein the first interaction period includes the user using a first product in a physical environment;
collect sensor data, regarding the physical environment, using sensor devices located in the physical environment, wherein the sensor data includes image data of images of the physical environment;
receive, from a machine learning system, a result of image analysis on the sensor data to identify the first product in the physical environment,
wherein objects, within the image data, are classified based on the machine learning system interfacing with a virtual environment rendering system;
generate, using the sensor data, a virtual environment corresponding to the physical environment, wherein the virtual environment is a digital twin of the physical environment, and wherein the virtual environment is generated based on the result of the image analysis and object classification performed by the machine learning system;
modify the virtual environment by replacing the first product with a virtual representation of a second product different than the first product, wherein the virtual environment is modified using an image processing technique;

collect, from second biometric sensors, biometric data for the user during a second interaction period, wherein the second interaction period includes the user using preferred features of the virtual representation of the second product in the virtual environment;

compute a first acceptance score for the first product based on the collected biometric data from the first interaction period;

compute a second acceptance score for the second product based on the collected biometric data from the second interaction period;

estimate a third acceptance score for using the second product in the physical environment based on the first acceptance score and the second acceptance score; and provide the user a recommendation that indicates how satisfied the user will be using the second product in the physical environment based on the third acceptance score.

25. The computer program product of claim 24, wherein the computer readable storage media includes program instructions executable by the processor to cause the computing devices to apply a scale factor, which compensates for a difference between performing a task in a physical environment and performing the task in a virtual environment, to the biometric data collected for the user during the second interaction period.

* * * * *